(12) United States Patent
Yoon et al.

(10) Patent No.: US 9,380,581 B2
(45) Date of Patent: *Jun. 28, 2016

(54) METHOD AND APPARATUS FOR ALLOCATING CHANNEL STATE INFORMATION-REFERENCE SIGNAL IN WIRELESS COMMUNICATION SYSTEM

(71) Applicant: Pantech Co., Ltd., Seoul (KR)

(72) Inventors: Sungjun Yoon, Seoul (KR); Kibum Kwon, Ansan-si (KR)

(73) Assignee: Pantech Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/464,041

(22) Filed: Aug. 20, 2014

(65) Prior Publication Data

US 2014/0355711 A1 Dec. 4, 2014

Related U.S. Application Data

(63) Continuation of application No. 14/043,005, filed on Oct. 1, 2013, now Pat. No. 8,837,452, which is a continuation of application No. 13/008,685, filed on Jan. 18, 2011, now Pat. No. 8,576,822.

(30) Foreign Application Priority Data

Jan. 18, 2010 (KR) ........................ 10-2010-0004219

(51) Int. Cl.
*H04W 72/04* (2009.01)
*H04L 5/00* (2006.01)
(Continued)

(52) U.S. Cl.
CPC .............. *H04W 72/0453* (2013.01); *H04B 7/06* (2013.01); *H04B 7/08* (2013.01); *H04B 7/0817* (2013.01); *H04L 5/0023* (2013.01);
(Continued)

(58) Field of Classification Search
CPC ................... H04B 2201/70701; H04B 7/2628; H04B 12/006; H04J 2011/0003
See application file for complete search history.

(56) References Cited

U.S. PATENT DOCUMENTS

2010/0104034 A1 4/2010 Nam et al.
2011/0170435 A1 7/2011 Kim et al.
(Continued)

OTHER PUBLICATIONS

International Search Report issued on Sep. 29, 2011 in PCT Application No. PCT/KR2011/000371.
Written Opinion issued on Sep. 29, 2011 in PCT Application No. PCT/KR2011/000371.
(Continued)

*Primary Examiner* — Hassan Phillips
*Assistant Examiner* — Prenell Jones
(74) *Attorney, Agent, or Firm* — H.C. Park & Associates, PLC

(57) ABSTRACT

Disclosed are an apparatus for Channel State Information-Reference Signal (CSI-RS) allocation and a method for CSI-RS transmission using the same in a wireless communication system. A CSI-RS for each antenna port is allocated to REs or subcarriers on a basis of a symbol or symbol axis in a subframe or Resource Block (RB), and is allocated in such a manner that a distance between neighboring CSI-RS allocation REs or subcarriers may be 3 REs or subcarriers. Accordingly, in the range of following CSI-RS transmission overhead, CSI-RSs are allocated to a time-frequency resource domain in such a manner so as to have perfect orthogonality or quasi-orthogonality according to cells or cell groups. Then, the CSI-RSs, which have been allocated to the time-frequency resource domain, are transmitted.

20 Claims, 19 Drawing Sheets

(51) Int. Cl.
  *H04B 7/06* (2006.01)
  *H04B 7/08* (2006.01)
  *H04L 25/02* (2006.01)
  *H04L 25/03* (2006.01)

(52) U.S. Cl.
  CPC ........... *H04L 5/0026* (2013.01); *H04L 5/0048* (2013.01); *H04L 5/0057* (2013.01); *H04L 5/0073* (2013.01); *H04L 5/0082* (2013.01); *H04L 25/0226* (2013.01); *H04L 2025/03426* (2013.01); *H04L 2025/03802* (2013.01)

(56) References Cited

U.S. PATENT DOCUMENTS

| | | |
|---|---|---|
| 2011/0237270 A1 | 9/2011 | Noh et al. |
| 2011/0255635 A1 | 10/2011 | Lee et al. |
| 2012/0033643 A1 | 2/2012 | Noh et al. |
| 2012/0147829 A1 | 6/2012 | Zhang et al. |
| 2012/0201318 A1 | 8/2012 | Seo et al. |

OTHER PUBLICATIONS

3GPP TSG-RAN1 #58, CSI-RS Design for Virtualized LTE Antenna in LTE-A System,: R1-093152, Shenzhen, China, Aug. 24-28, 2009.

3GPP TSG RAN WG1 Meeting #58bis, "Further Details on CSI-RS Design for LTE-Advanced," R1-094171, Miyazaki, Japan, Oct. 12-16, 2009.

3GPP TSG RAN WG1 Meeting #59, "Important Issues Concerning CSI-RS for both FDD and TDD" R1-094547, Jeju, Korea, Nov. 9-13, 2009.

Non-Final Office Action issued on Mar. 7, 2013 in U.S. Appl. No. 13/008,685.

Notice of Allowance issued on Jul. 1, 2013 in U.S. Appl. No. 13/008,685.

NTT DOCOMO "DL CSI-RS Design for LTE-Advanced", 3GPP TSG RAN WG1 Meeting #58bis, R1-094240, Oct. 12-16, 2009, Japan.

Non-Final Office Action issued on Dec. 23, 2013 in U.S. Appl. No. 14/043,005.

Notice of Allowance issued on May 15, 2014 in U.S. Appl. No. 14/043,005.

FIG.2
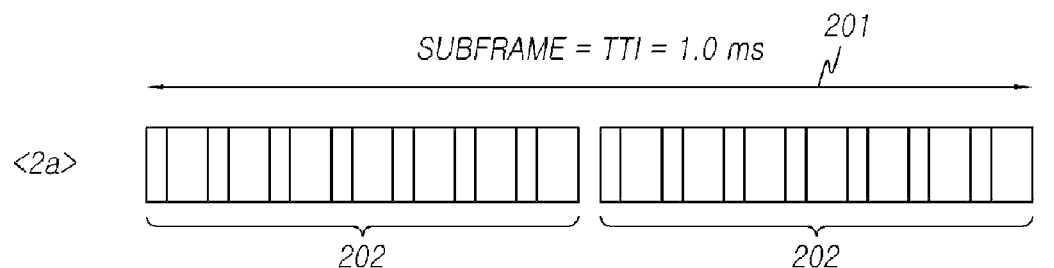
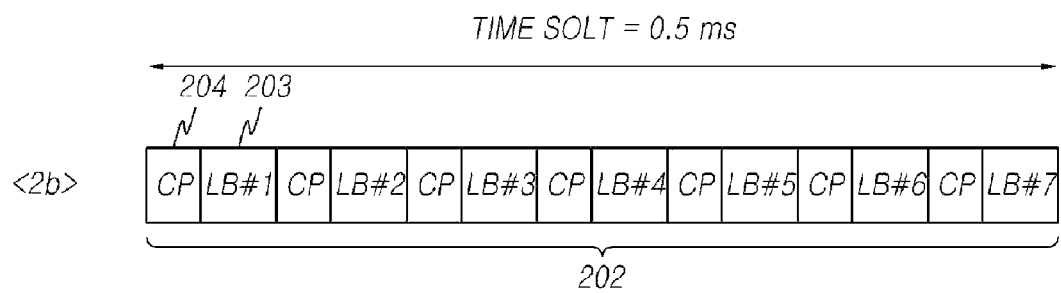
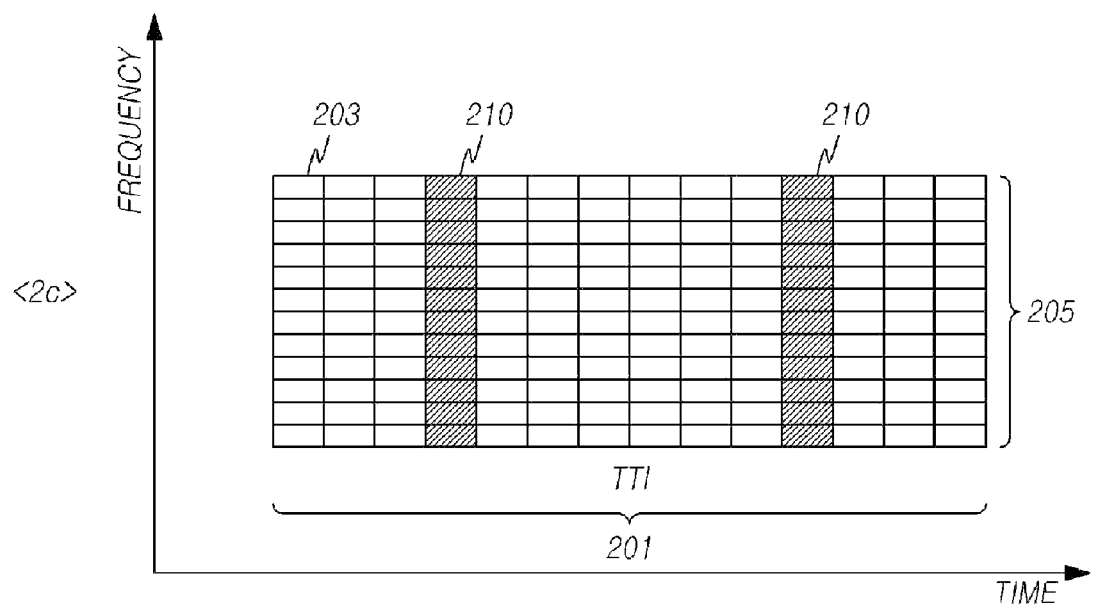

FIG.3
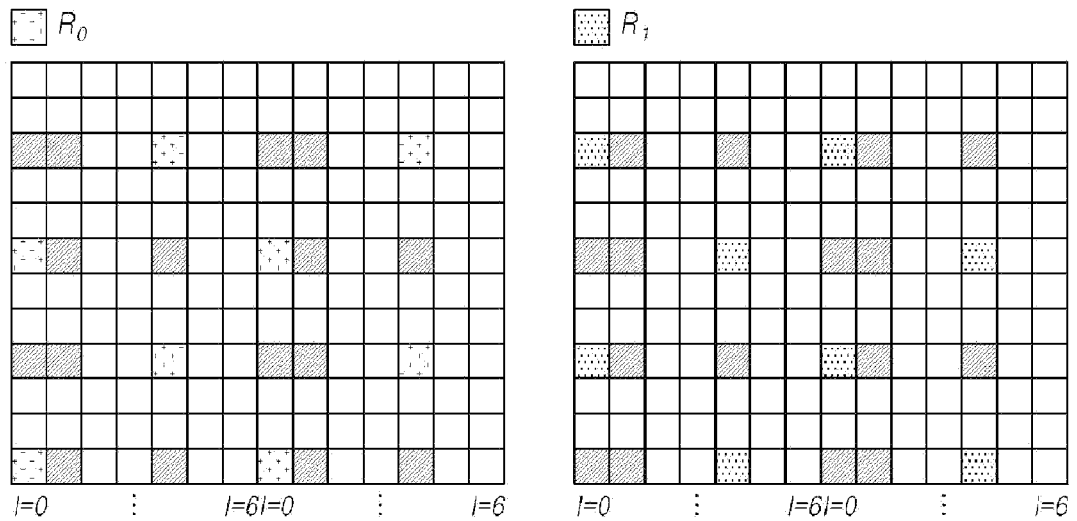
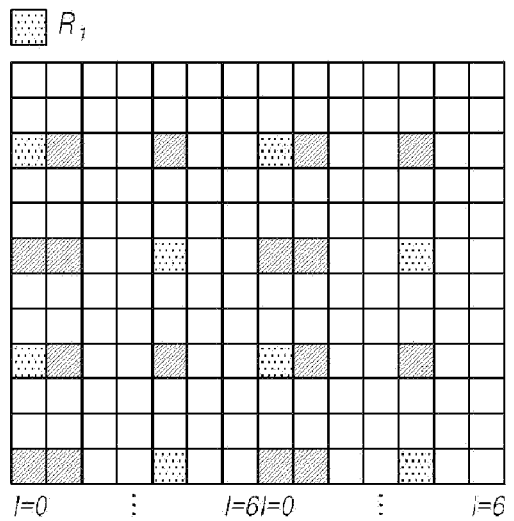
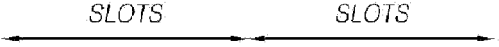
ANTENNA PORT 0     ANTENNA PORT 1
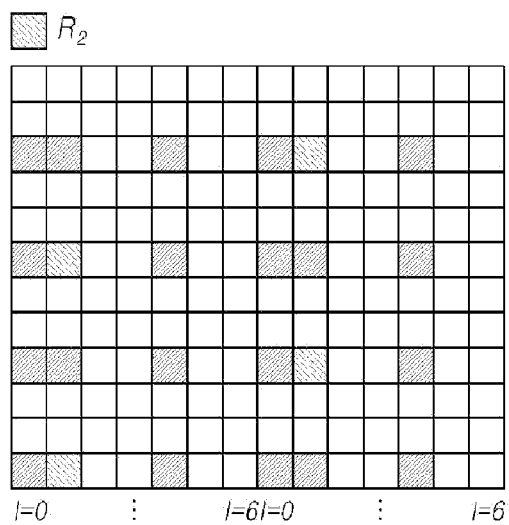
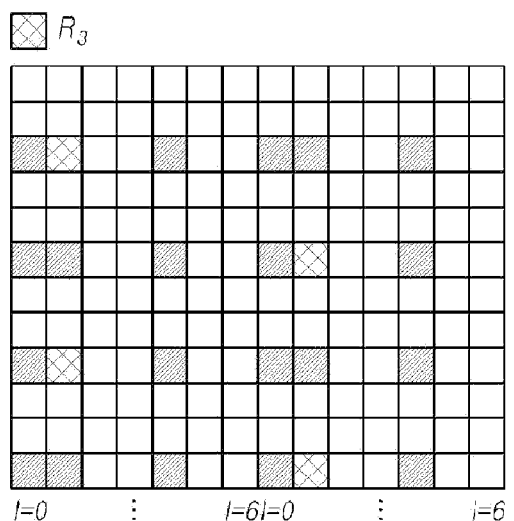
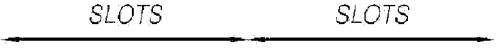
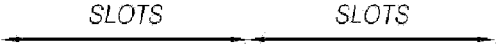
ANTENNA PORT 2     ANTENNA PORT 3

US 9,380,581 B2

METHOD AND APPARATUS FOR ALLOCATING CHANNEL STATE INFORMATION-REFERENCE SIGNAL IN WIRELESS COMMUNICATION SYSTEM

CROSS-REFERENCE TO RELATED APPLICATIONS

This is a continuation of U.S. patent application Ser. No. 14/043,005, filed on Oct. 1, 2013, which is a continuation of U.S. patent application Ser. No. 13/008,685, filed on Jan. 18, 2011, and issued as U.S. Pat. No. 8,576,822, and claims priority from and the benefit under 35 U.S.C. §119(a) of Korean Patent Application No. 10-2010-0004219, filed on Jan. 18, 2010, all of which are hereby incorporated by reference for all purposes as if fully set forth herein.

BACKGROUND

1. Field

Exemplary embodiments of the present invention relate to a wireless communication system, and more particularly to a method and an apparatus for allocating a Channel State Information-Reference Signal (CSI-RS) between cells in a wireless communication system.

2. Discussion of the Background

With the development of communication systems, consumers, including business companies and individuals, require wireless communication terminals supporting various services.

Current mobile communication systems, such as 3GPP (3rd Generation Partnership Project), LTE (Long Term Evolution), and LTE-A (LTE Advanced), are resulting in the development of technology for a high-speed large-capacity communication system, which can transmit or receive various data, such as images and wireless data, beyond the capability of providing a voice service, and can transmit data of such a large capacity as that transmitted in a wired communication network. Moreover, the current mobile communication systems require a proper error detection scheme, which can decrease the reduction of information loss and improve the system transmission efficiency, thereby improving the system performance.

Further, for the current wide variety of communication systems, various reference signals have been and are being proposed in order to provide counterpart apparatuses with information on a communication environment, etc., through a downlink or an uplink.

For example, in the LTE system, a Cell-specific Reference Signal (CRS), which is a reference signal, is transmitted at each sub-frame.

At this time, since the maximum number of antenna ports supportable in the downlink of the LTE system is four, CRSs are allocated to and transmitted through a maximum of four antennas according to the time/frequency.

Meanwhile, the next generation communication technologies, such as the LTE-A, which is being currently developed, can support a maximum of eight antennas. Therefore, the current CRSs defined for only four existing antennas are insufficient for detection of channel information at the time of downlink transmission. To this end, a technology for obtaining channel state information of a maximum of eight antennas by newly defining a reference signal named "Channel State Information-Reference Signal (CSI-RS)" is being discussed.

In other words, a communication system using a maximum of eight Multiple Input Multiple Output (MIMO) antennas at each of the transmission port and the reception port is being discussed, and a scheme of transmitting CSI-RSs discriminated according to the antenna ports or antenna layers for the transmission or reception thereof is being discussed. However, up to the present, only basic definitions for the CSI-RS and definitions for the overhead problem have been arranged, and definitions for CSI-RS allocation and transmission have not been arranged. In this regard, the next generation wireless communication systems are requiring a specific scheme for the CSI-RS allocation and transmission.

SUMMARY

Exemplary embodiments of the present invention provide a scheme for defining a CSI-RS pattern for each antenna/base station (cell), allocating the CSI-RS to resource areas, and transmitting the CSI-RS.

Exemplary embodiments of the present invention provide an apparatus and a method for allocating a Channel State Information-Reference Signal (CSI-RS) to a time-frequency resource area for each antenna port in a wireless communication system.

Exemplary embodiments of the present invention provide an apparatus and a method for allocating a CSI-RS to a time-frequency resource area so as to enable each cell to have an orthogonality or a quasi-orthogonality in a wireless communication system.

Exemplary embodiments of the present invention provide an apparatus and a method for allocating a CSI-RS for each antenna port, which enable each cell (or group) to have a frequency shift in a wireless communication system.

Exemplary embodiments of the present invention provide an apparatus and a method for allocating a CSI-RS, which can decrease performance degradation due to interference between neighbor cells in a wireless communication system.

Additional features of the invention will be set forth in the description which follows, and in part will be apparent from the description, or may be learned by practice of the invention.

An exemplary embodiment of the present invention provides a method for transmitting a Channel State Information-Reference Signal (CSI-RS), the method including: generating a CSI-RS sequence for an antenna port for transmission of a maximum of N (N being an integer larger than or equal to 1) number of CSI-RSs; mapping the generated CSI-RS sequence to Resource Elements (REs) allocated for transmission of the CSI-RS; and generating an Orthogonal Frequency Division Multiplexing (OFDM) signal including information on the mapped CSI-RS sequence and transmitting the generated OFDM signal to a reception apparatus, wherein, in mapping the generated CSI-RS sequence to the REs, the CSI-RS sequence is mapped to REs corresponding to one sub-carrier at every 12 sub-carriers with respect to two OFDM symbols or symbol axes for each antenna port within a particular sub-frame by which the CSI-RS is transmitted, for a total of $\lceil N/2 \rceil$ antenna port sets, each of which includes either both an $M^{th}$ ($M \leq N$, and M being an odd number) antenna port and an $(M+1)^{th}$ antenna port or only the $M^{th}$ antenna port if the $(M+1)^{th}$ antenna port does not exist and is used as an antenna port set for transmission of one CSI-RS, a CSI-RS of antenna ports within each of the antenna port sets is allocated to REs having the same time-frequency resource and are discriminated from each other by orthogonal codes, and the CSI-RS allocated REs of different antenna port sets adjacent to each other in the frequency axis are spaced apart from each other with an interval of 3 REs.

An exemplary embodiment of the present invention provides a method for transmitting a Channel State Information- Reference Signal (CSI-RS), the method including: generating a CSI-RS sequence for an antenna port for transmission of a maximum of 8 CSI-RSs; mapping the generated CSI-RS sequence to Resource Elements (REs) allocated for transmission of the CSI-RS; and generating an Orthogonal Frequency Division Multiplexing (OFDM) signal including information on the mapped CSI-RS sequence and transmitting the generated OFDM signal to a reception apparatus, wherein, in mapping the generated CSI-RS sequence to the REs, the CSI-RS sequence is mapped to REs corresponding to one sub-carrier at every 12 sub-carriers with respect to two OFDM symbols or symbol axes for each antenna port within a particular sub-frame by which the CSI-RS is transmitted, for a total of four antenna port sets, each of which includes either both an $M^{th}$ (M=1, 3, 5, 7) antenna port and an $(M+1)^{th}$ antenna port or only the $M^{th}$ antenna port if the $(M+1)^{th}$ antenna port does not exist and is used as an antenna port set for transmission of one CSI-RS, a CSI-RS of antenna ports within each of the antenna port sets is allocated to REs having the same time-frequency resource and are discriminated from each other by orthogonal codes, and the CSI-RS allocated REs of different antenna port sets adjacent to each other in the frequency axis are spaced apart from each other with an interval of 3 REs.

An exemplary embodiment of the present invention provides a method for receiving a CSI-RS, the method including: receiving a transmitted signal; extracting CSI-RS information for each of multiple antenna ports allocated to a particular Resource Element (RE) through resource element demapping of the received signal; and acquiring channel state information from the extracted CSI-RS information, wherein, in the transmitted signal, for an antenna port for transmission of a maximum of N (N being an integer larger than or equal to 1) number of CSI-RSs, the CSI-RS sequence is mapped to REs corresponding to one sub-carrier at every 12 sub-carriers with respect to two Orthogonal Frequency Division Multiplexing (OFDM) symbols or symbol axes for each antenna port within a particular sub-frame by which the CSI-RS is transmitted, for a total of $\lceil N/2 \rceil$ antenna port sets, each of which includes either both an $M^{th}$ (M≤N, and M being an odd number) antenna port and an $(M+1)^{th}$ antenna port or only the $M^{th}$ antenna port if the $(M+1)^{th}$ antenna port does not exist and is used as an antenna port set for transmission of one CSI-RS, a CSI-RS of antenna ports within each of the antenna port sets is allocated to REs having the same time-frequency resource and are discriminated from each other by orthogonal codes, and the CSI-RS allocated REs of different antenna port sets adjacent to each other in the frequency axis are spaced apart from each other with an interval of 3 REs.

An exemplary embodiment of the present invention provides a method for transmitting a CSI-RS, the method including: generating a CSI-RS for each of a maximum of 8 antenna ports; allocating a CSI-RS of an antenna port to four Resource Elements (REs) or sub-carriers based on a unit of one symbol (or symbol axis) in a time-frequency resource area within one sub-frame in such a manner that adjacent CSI-RS allocated REs or sub-carriers have an interval of 3 REs or sub-carriers therebetween; and transmitting the CSI-RS allocated to the time-frequency resource area to a reception apparatus.

An exemplary embodiment of the present invention provides a method for receiving a CSI-RS, the method including: receiving a signal through each of multiple antenna ports; extracting a CSI-RS for each of the multiple antenna ports allocated to a particular Resource Element (RE) from the received signal; demapping a CSI-RS sequence for each antenna port; and acquiring channel state information of each antenna port by using the demapped CSI-RS sequence, wherein the received signal is a signal generated by allocating CSI-RSs for a total of 8 antenna ports to two symbols or symbol axes of a time-frequency area within one sub-frame in such a manner that CSI-RS allocated REs or sub-carriers adjacent to each other have an interval of 3 REs or sub-carriers therebetween, and a CSI-RS of a first antenna port and a CSI-RS of a second antenna port are repeatedly allocated two REs while being discriminated from each other by orthogonal codes.

An exemplary embodiment of the present invention provides an apparatus to transmit a Channel State Information-Reference Signal (CSI-RS), the apparatus including: a CSI-RS generator for generating a CSI-RS sequence for an antenna port for transmission of a maximum of N (N being an integer larger than or equal to 1) number of CSI-RSs; a CSI-RS resource allocator to map the generated CSI-RS sequence to Resource Elements (REs) allocated for transmission of the CSI-RS; and an OFDM signal generator to generate an Orthogonal Frequency Division Multiplexing (OFDM) signal including information on the mapped CSI-RS sequence and to transmit the generated OFDM signal to a reception apparatus, wherein the CSI-RS resource allocator maps the CSI-RS sequence to REs corresponding to one sub-carrier at every 12 sub-carriers with respect to two OFDM symbols or symbol axes for each antenna port within a particular sub-frame by which the CSI-RS is transmitted, for a total of $\lceil N/2 \rceil$ antenna port sets, each of which includes either both an $M^{th}$ (M≤N, and M being an odd number) antenna port and an $(M+1)^{th}$ antenna port or only the $M^{th}$ antenna port when the $(M+1)^{th}$ antenna port does not exist and is used as an antenna port set for transmission of one CSI-RS, a CSI-RS of antenna ports within each of the antenna port sets is allocated to REs having the same time-frequency resource and are discriminated from each other by orthogonal codes, and the CSI-RS allocated REs of different antenna port sets adjacent to each other in the frequency axis are spaced apart from each other with an interval of 3 REs.

An exemplary embodiment of the present invention provides an apparatus to receive a CSI-RS, the apparatus including: a reception processing unit to receive a transmitted signal; a CSI-RS extraction unit to extract CSI-RS information for each of multiple antenna ports allocated to a particular Resource Element (RE) through resource element demapping of the received signal; and a channel state measurement unit for acquiring channel state information from the extracted CSI-RS information, wherein, in the transmitted signal, for an antenna port for transmission of a maximum of N (N being an integer larger than or equal to 1) number of CSI-RSs, the CSI-RS sequence is mapped to REs corresponding to one sub-carrier at every 12 sub-carriers with respect to two Orthogonal Frequency Division Multiplexing (OFDM) symbols or symbol axes for each antenna port within a particular sub-frame by which the CSI-RS is transmitted, for a total of $\lceil N/2 \rceil$ antenna port sets, each of which includes either both an $M^{th}$ (M≤N, and M being an odd number) antenna port and an $(M+1)^{th}$ antenna port or only the $M^{th}$ antenna port if the $(M+1)^{th}$ antenna port does not exist and is used as an antenna port set for transmission of one CSI-RS, a CSI-RS of antenna ports within each of the antenna port sets is allocated to REs having the same time-frequency resource and are discriminated from each other by orthogonal codes, and the CSI-RS allocated REs of different antenna port sets adjacent to each other in the frequency axis are spaced apart from each other with an interval of 3 REs.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIGS. 2a to 2c illustrate sub-frame structures of transmission data according to exemplary embodiments of the present invention.

FIG. 3 illustrates examples of mapping of CRSs to a time-frequency resource block according to an exemplary embodiment.

DETAILED DESCRIPTION OF THE ILLUSTRATED EMBODIMENTS

Figure 1:
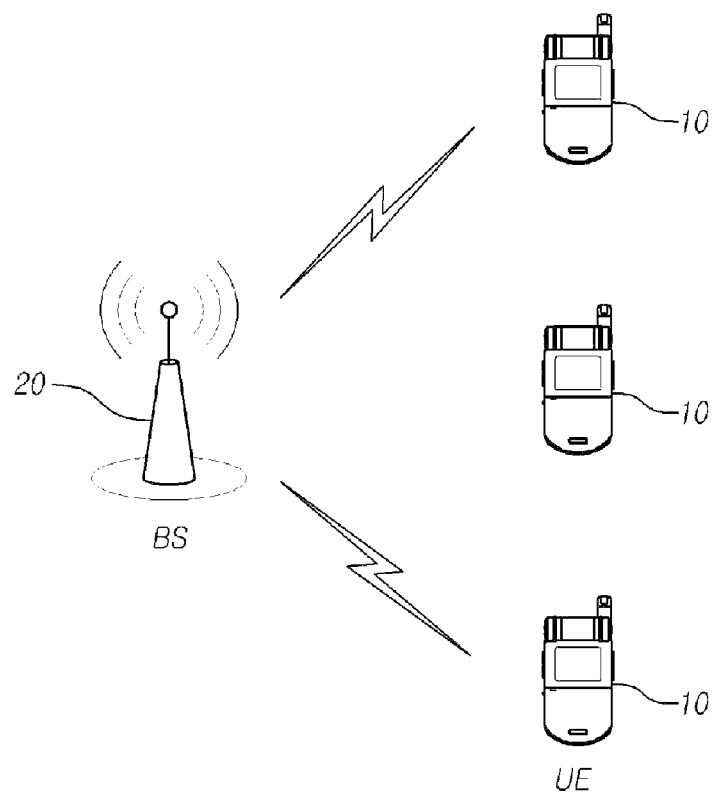
FIG. 1 illustrates a wireless communication system according to an exemplary embodiment of the present invention.

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough, and will fully convey the scope of this disclosure to those skilled in the art. Various changes, modifications, and equivalents of the systems, apparatuses, and/or methods described herein will likely suggest themselves to those of ordinary skill in the art. Same elements, features, and structures are denoted by same reference numerals throughout the drawings and the detailed description, and the size and proportions of some elements may be exaggerated in the drawings for clarity and convenience.

FIG. 1 illustrates a wireless communication system according to an exemplary embodiment of the present invention. Wireless communication systems are widely arranged in order to provide various communication services, such as voice, packet data, and the like. Referring to FIG. 1, a wireless communication system includes a UE (User Equipment) 10 and a BS (Base Station) 20. As shown in FIG. 1, a plurality of UEs 10 may be included in the wireless communication system.

As used herein, the UE 10 may include a user terminal in a wireless communication, a UE in WCDMA, LTE, HSPA (High Speed Packet Access), and the like, a MS (Mobile Station), a UT (User Terminal), SS (Subscriber Station), a wireless device in GSM (Global System for Mobile Communication), and the like.

The BS 20 may be a cell and may generally refer to a fixed station communicating with the UE 10, and may be a Node-B, eNB (evolved Node-B), BTS (Base Transceiver System), AP (Access Point), relay node, and the like. That is, as used herein, the BS 20 or cell should be construed as having an inclusive meaning indicating an area controlled by a BSC (Base Station Controller) of the CDMA, a Node B, etc. of the WCDMA, and may correspond to one of various coverage areas, which include a mega cell, a macro cell, a micro cell, a pico cell, femto cell, etc.

However, the UE 10 and the BS 20 are not limited to specifically expressed terms or words and inclusively indicate two transmitting and receiving elements used for implementation of the aspects of the present invention described herein.

Aspects of the present invention provide for various multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, and OFDM-CDMA, which may be applied to the wireless communication system. However, aspects of the present invention are not limited thereto.

For an uplink transmission and a downlink transmission, aspects of the present invention may provide a TDD (Time Division Duplex) scheme using different times for transmission or an FDD (Frequency Division Duplex) scheme using different frequencies for transmission.

Exemplary embodiments of the present invention may be applied to a resource allocation in the field of asynchronous wireless communications, which may include the LTE (Long Term Evolution) and the LTE-Advanced (LTE-A) the GSM, the WCDMA, and the HSPA, and in the field of synchronous wireless communications, which may include the CDMA, CDMA-2000, and UMB. Aspects of the present invention should not be limited or restrictively construed to a particular wireless communication field, and should be construed to include all technical fields, to which the aspects of the present invention can be applied.

A wireless communication system, to which aspects of the present invention are applicable, can support uplink and/or downlink hybrid automatic repeat request (HARQ) and can use a Channel Quality Indicator (CQI) for link adaptation. Further, different multiple access schemes may be used for downlink transmission and uplink transmission. For example, an Orthogonal Frequency Division Multiple Access (OFDMA) scheme may be used for the downlink, while a Single Carrier-Frequency Division Multiple Access (SC-FDMA) scheme is used for the uplink.

The radio interface protocol layers between a UE and a network can be classified into the first layer (L1), the second layer (L2), and the third layer (L3) based on the lower three layers of the Open System Interconnection (OSI) model widely known in the communication systems, and the physical layer belonging to the first layer provides an information transfer service using a physical channel.

Meanwhile, the wireless communication system according an exemplary embodiment of the present invention is applied, one radio frame or wireless frame includes ten sub-frames and one sub-frame may include two slots.

The basic unit for data transmission is a sub-frame, and downlink or uplink scheduling is performed for each sub-frame. One slot may include a plurality of OFDM symbols in the time axis domain (time domain) and a plurality of sub-carriers in the frequency axis domain (frequency domain).

For example, one sub-frame includes two time slots. Further, in the case of using a normal Cyclic Prefix (CP) in the time domain, each time slot may include seven symbols (six or three symbols in the case of using an extended CP), and may include sub-carriers corresponding to a bandwidth of 180 kHz (since one sub-carrier has a bandwidth of 15 kHz, the bandwidth of 180 kHz corresponds to a total of 12 sub-carriers) in the frequency domain. The time-frequency region, which is defined by one slot along the time axis and the bandwidth of 180 kHz along the frequency axis, can be referred to as a Resource Block (RB).

FIG. 2a illustrates a sub-frame structure of transmission data according to an exemplary embodiment of the present invention. Referring to FIG. 2a, the transmission time of a frame can be divided into multiple Transmission Time Intervals (TTIs) 201, each having a duration of 1.0 ms. The terms "TTI" and "sub-frame" have the same meaning, and each frame has a length of 10 ms and includes 10 TTIs. Further, one TTI includes two time slots 202 having the same length, wherein each time slot has a duration of 0.5 ms.

FIG. 2b illustrates a typical structure of one of the time slots 202 according to an exemplary embodiment of the present invention. Referring to FIG. 2b, the TTI is a basic transmission unit, and one TTI includes the two time slots 202 having the same length, wherein each time slot has a duration of 0.5 ms. The time slot includes a plurality of Long Blocks (LBs) 203, each of which corresponds to a symbol. The LBs 203 are separated from each other by Cyclic Prefixes (CPs) 204. The CPs include a normal CP and an extended CP, which are classified according to the lengths. The multiple LBs within one time slot include seven LBs in the case of using the normal CPs, while the multiple LBs within one time slot include six or three LBs in the case of using the extended CPs.

In summary, one TTI or sub-frame 201 may include 14 LB symbols 203 if the normal CP 204 is used, and may include 12 LB symbols 203 (6 LB symbols in a special case) if the extended CP 204 is used. However, aspects of the present invention are not limited to the frame, sub-frame, or time-slot structure as described above.

FIG. 2c illustrates one Resource Block (RB) 230 during one sub-frame or TTI 201 according to an exemplary embodiment of the present invention, wherein each TTI or sub-frame can be divided into 14 symbols (axes) in the case of normal CP 204 or divided into 12 (or 6) symbols (axes) 203 in the case of extended CP 204 in the time domain. Each symbol (axis) can carry one OFDM symbol.

Further, the entire system bandwidth having a length of 20 MHz can be divided into sub-carriers having different frequencies. For example, as described above, an area, which includes one slot in the time domain and sub-carriers corresponding to the bandwidth of 180 kHz (12 sub-carriers if each sub-carrier has a bandwidth of 15 kHz) in the frequency domain, can be referred to as a Resource Block (RB).

For example, the bandwidth of 10 MHz within one TTI may include 50 RBs in the frequency domain.

In the RB structure shaped like a grid as described above, each unit space shaped like a grid cell is referred to as a Resource Element (RE). For example, if a resource area includes one sub-frame in the time domain and sub-carriers corresponding to a bandwidth of 180 kHz in the frequency domain, and uses normal CPs, wherein each of the sub-carriers has a frequency bandwidth of 15 kHz, the resource area may include a total of 168 REs (i.e., 14 symbols×12 sub-carriers).

In the LTE communication system, reference signals include a Cell-specific Reference Signal (CRS), a Multicast/Broadcast over Single Frequency Network (MBSFN) reference signal, and a UE-specific reference signal, and/or Demodulation Reference Signal (DM-RS).

The CRS is included in and transmitted by all downlink sub-frames of a cell supporting the Physical Downlink Shared Channel (PDSCH) transmission. Further, the transmission may be performed through one or multiple antennas, for example, from among antenna Nos. 0 to 3.

Further, one reference signal is transmitted through each downlink antenna port, and an RE used for transmission of an RS through one port from among the antenna ports within a slot cannot be used for another antenna port within the same slot.

FIG. 3 illustrates examples of mapping of CRSs to a time-frequency resource block according to an exemplary embodiment. The examples shown in FIG. 3 include mapping of CRSs to time-frequency REs according to four different antenna ports. In each antenna port, the REs, to which CRSs are allocated, have a period of 6 for the sub-carriers.

In FIG. 3, Rp indicates an RE used for transmission of a reference signal at antenna port p. For example, $R_0$ indicates an RE used for transmission of a reference signal at an antenna port 0.

Meanwhile, in the next generation communication technology, the current CRSs defined for only four existing antennas are insufficient for detection of channel information at the time of downlink transmission. To this end, a reference signal named "Channel State Information-Reference Signal (CSI-RS)" is newly defined in order to support a maximum of eight antennas in the downlink, thereby obtaining channel state information.

According to the current basic definition relating to the CSI-RS, CSI-RSs are mapped to two REs for each antenna port within one radio frame. In other words, CSI-RSs are mapped to two REs for each antenna port in an area including 12 sub-carriers corresponding to one RB along the frequency axis and one radio frame corresponding to the time of 10 ms including 10 sub-frames along the time axis. That is, for a total of eight antenna ports, a maximum of 16 REs are allocated to and transmitted by a sub-frame or sub-frames. At this time, all of the 16 REs may be allocated to and transmitted by one sub-frame from among the ten sub-frames (in this case, the CSI-RSs are transmitted at a period of 10 ms), or may be allocated to and transmitted by two or more sub-frames from among the ten sub-frames.

For example, the CSI-RSs may be divided into two groups (sets) each corresponding to a maximum of 8 REs and may be then transmitted by two sub-frames from among the ten sub-frames. At this time, the CSI-RSs are transmitted at a period of 5 ms or 10 ms.

Meanwhile, a communication system using a maximum of 64 (i.e., 8×8) Multiple Input Multiple Output (MIMO) antennas at both the transmission port and the reception port is being discussed. In the discussed communication system, since different CSI-RSs according to the antenna ports or antenna layers should be transmitted, a transmitter should allocate CSI-RSs for a total of eight antenna ports to a time-frequency domain in a discriminated manner. Especially, the CSI-RSs may be allocated in a manner capable of discriminating cells from each other in the multi-cell environment.

According to aspects of the present invention, antenna layers may be data layers, which can be logically simultaneously transmitted from a base station or a mobile communication terminal to multiple antenna ports. However, the antenna layers may have the same data or different data. Therefore, the number of the antenna layers may be equal to or smaller than the number of antenna ports. Meanwhile, an antenna port number is used to express each time-frequency resource area. Therefore, among antenna ports used for the same purpose, different antenna port numbers indicate different antennas corresponding to spatially discriminated time-frequency resource areas.

For example, antenna port numbers for CRSs using a maximum of four antennas include 0 to 3. Further, in the case of MBSFN-RS, LTE Rel-8 UE-specific RS (DM-RS), and PRS (Positioning Reference Signal), each of which uses a maximum of one antenna, antenna port numbers include 4, 5, and 6. Further, in the case of LTE Rel-10 DM-RS, which uses a maximum of 8 antennas, antenna port numbers include 7 to 14. In the case of CSI-RS, which also uses a maximum of 8 antennas, numbers following 14 may be used for antenna port numbers. That is, antenna port numbers 15 to 22 may be used for antenna port numbers, and antenna port number 15 may be used for the first antenna port for CSI-RS transmission. At this time, within each particular reference signal, different antenna port numbers indicate antennas having spatially discriminated time-resource areas.

The following description is based on an antenna port, although it can be applied to an antenna layer.

Figure 4:
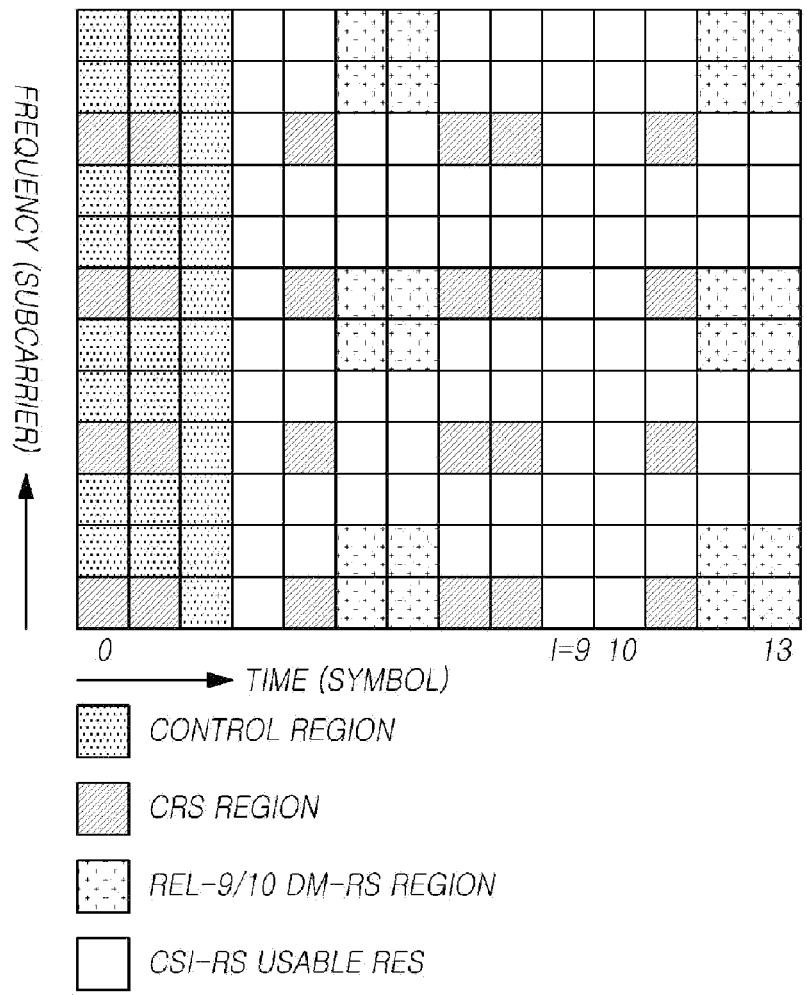
FIG. 4 is an illustrative view showing a representative example of mapping a CSI-RS according to an exemplary embodiment.

FIG. 4 is an illustrative view showing a representative example of mapping a CSI-RS according to an exemplary embodiment. Referring to FIG. 4, in a case where a normal CP (Cyclic Prefix) of a normal subframe is used for a single subframe, locations of the CRS (Cell-specific Reference Signal), the control region, and the LTE Rel-9/10 DM-RS (Demodulation Reference Signal), among a total of 14 symbols are taken into consideration, and normal CPs can be allocated to the 10th or 11th symbol and then transmitted while preventing the normal CPs from overlapping with the CRS, the control region, and the LTE Rel-9/10 DM-RS. However, aspects of the present invention are not limited to this configuration. For reference, a UE-specific RS (or DM-RS) region of the LTE Rel-8 is not shown in FIG. 4.

At this time, if CSI-RSs are allocated to 16 REs in a single subframe, REs may be transmitted in such a manner that each of 2 symbols (or symbol axes) includes 8 REs. If CSI-RSs corresponding to 8 REs are allocated to a single subframe, REs may be transmitted in such a manner that the 8 REs are all allocated to a single symbol (or symbol axis). The REs may be transmitted in such a manner that each of 2 symbols (or symbol axes) includes 4 REs.

Figure 5:
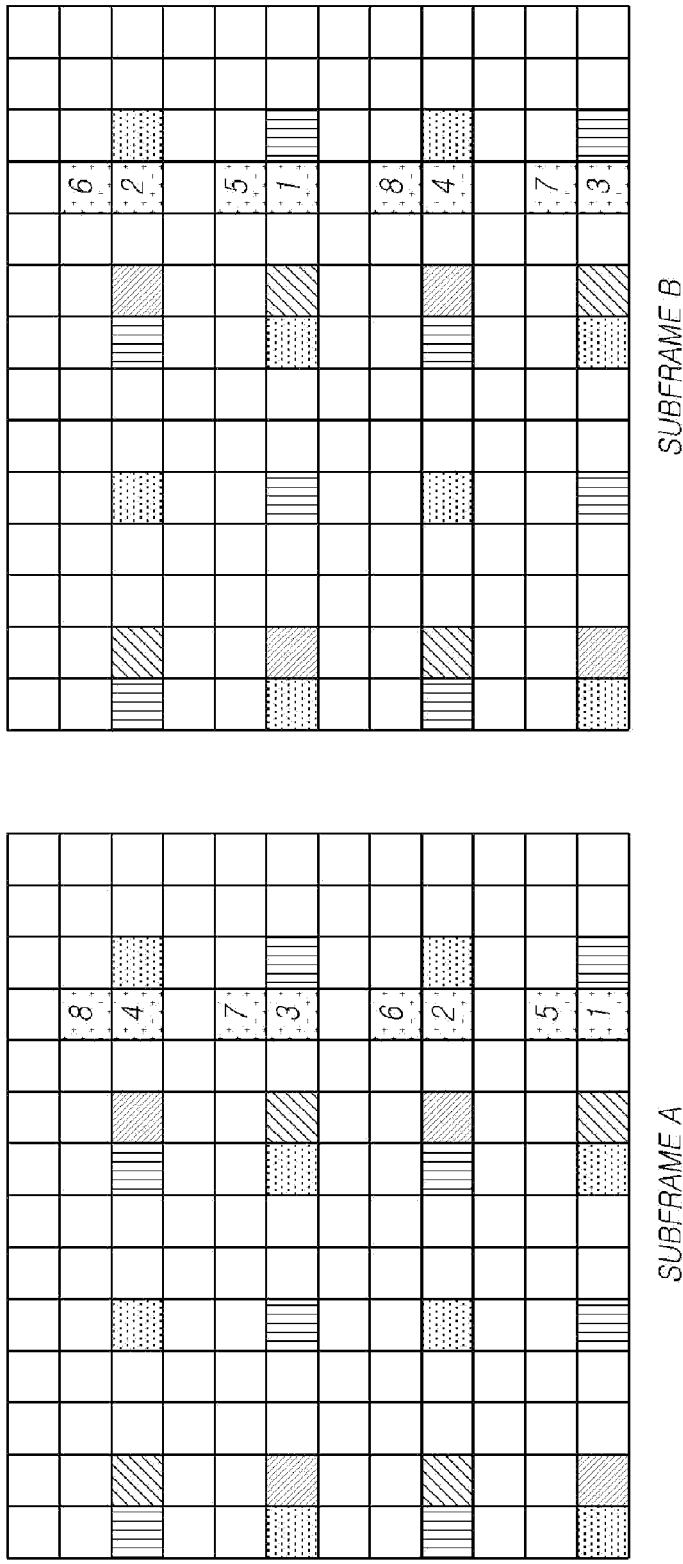
FIGS. 5 to 7 are illustrative views showing exemplary embodiments of basic schemes for CSI-RS allocation for each antenna port according to the FDM, (FDM+TDM), and (FDM+CDM) schemes, respectively.
Figure 6:
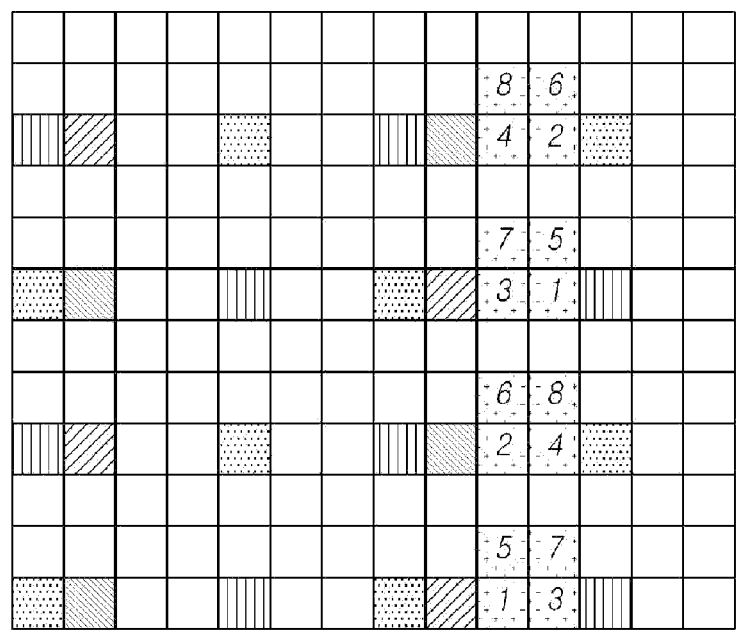
Figure 7:
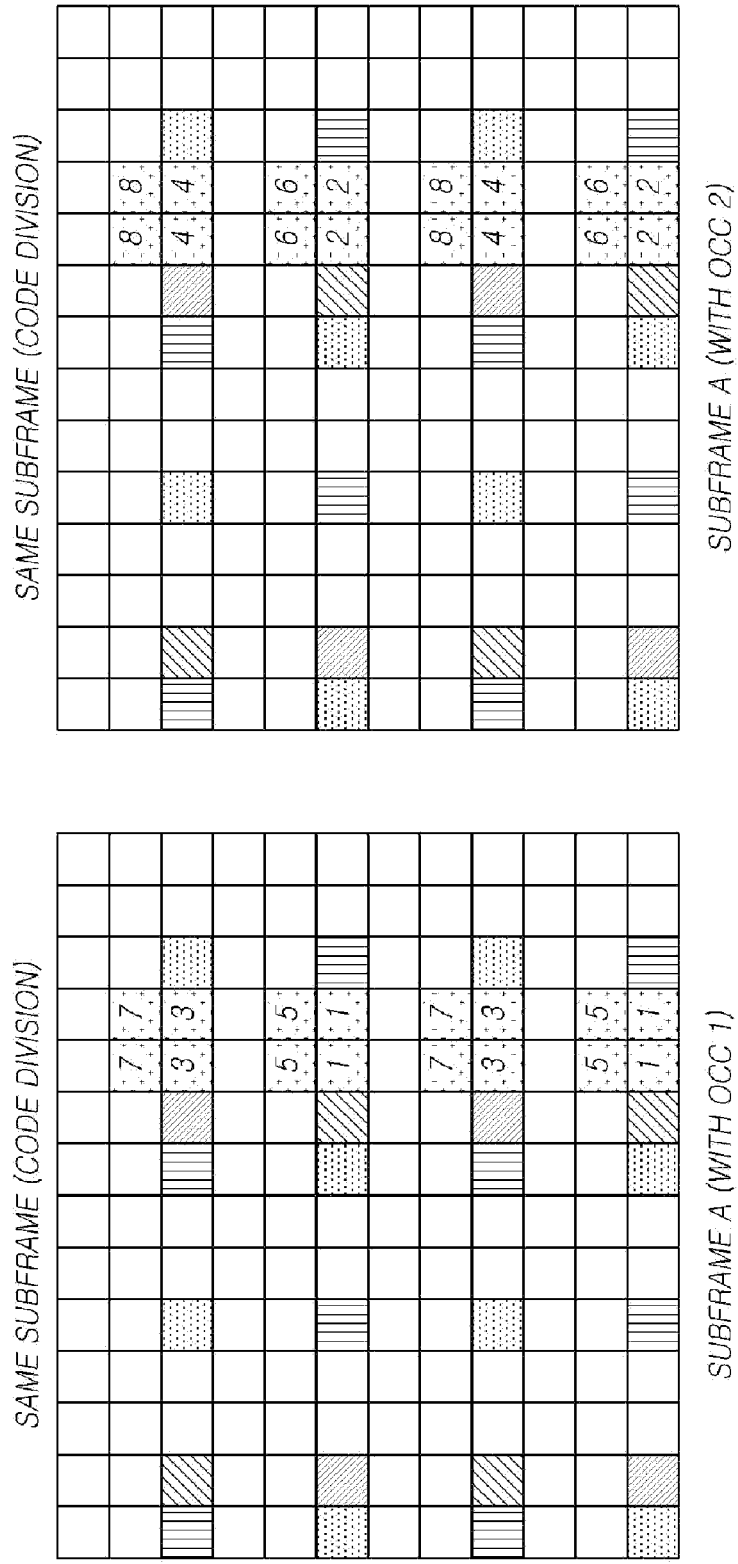

FIGS. 5 to 7 are illustrative views showing exemplary embodiments of basic schemes for CSI-RS allocation for each antenna port according to the FDM, (FDM+TDM), and (FDM+CDM) schemes, respectively.

In FIGS. 5 to 7, an RE indicated by a reference numeral represents an RE allocated to a CSI-RS, and the reference numeral represents a number of an antenna port allocated to a CSI-RS. In this case, the antenna port number signifies a number of an antenna port for transmitting a CSI-RS. The antenna port numbers may be obtained by sequentially numbering, but not necessarily consecutively numbering, for example, "1" to "8" in consideration of a maximum of 8 CSI-RS transmission antennas. Also, the antenna port numbers do not signify reference numerals indicating absolute antenna port numbers considering all RSs.

In an FDM scheme as shown in FIG. 5, 8 antenna ports are distinguished only by frequency resources. A single Resource Block (RB) includes 12 subcarriers along the frequency axis. Therefore, if 8 subcarriers are distinguished within a single symbol axis as shown in the FDM scheme of FIG. 5, the 8 subcarriers can be used to distinguish between all 8 antenna ports. Herein, CSI-RS allocation overhead is 2 REs per antenna port (i.e., 16 REs for the 8 antenna ports) in a region of subcarriers, the number of which is 10 ms (140 symbols for a normal subframe having normal CPs)×12 as described above. Therefore, 8 REs can be allocated to each of 2 subframes.

In an (FDM+TDM) scheme as illustrated in FIG. 6, 8 antenna ports are distinguished by frequency and time resources. In the (FDM+TDM) scheme, 4 antennas are distinguished by the frequency axis, and 4 antenna ports are again distinguished by different symbols along the time axis. As a result, a total of 8 antenna ports can be distinguished.

In an (FDM+CDM) scheme as illustrated in FIG. 7, 8 antenna ports are distinguished by frequency and code resources. In the (FDM+CDM) scheme, 4 antenna ports are distinguished by the frequency axis, and 4 antenna ports are again distinguished by different codes. As a result, a total of 8 antenna ports can be distinguished. For example, No. 1 antenna and No. 2 antenna are allocated to the same RE and the same RE allocated the No. 1 antenna and No. 2 antenna is then transmitted in a time-frequency domain. However, the No. 1 antenna and No. 2 antenna are distinguished by different codes, such as the Orthogonal Cover Code (OCC), which have the orthogonality.

FIGS. 5 to 7 illustrate basic schemes for CSI-RS allocation for each antenna port according to the FDM, (FDM+TDM), and (FDM+CDM) schemes, respectively. However, aspects are not limited thereto such that various methods may be provided according to CSI-RS allocation overhead and schemes equivalent to the schemes as described above.

Moreover, the schemes for CSI-RS pattern allocation as illustrated in FIG. 4 and FIGS. 5 to 7 all have perfect orthogonality for each antenna port, and are distinguished from one another. However, if the schemes for the CSI-RS pattern allocation as described above are used and Base Stations (BSs) or cells are distinguished only by CSI-RS sequences mapped to defined CSI-RS patterns respectively, many neighboring cells may simultaneously transmit CSI-RSs through the same time-frequency resource. As a result, there may exist a problem in that interference between neighboring cells causes performance degradation.

Particularly, in a communication system such as a Cooperative Multipoint Tx/Rx System (CoMP), in which the relevant user needs to transmit/receive a reference signal to/from a neighboring cell as well as a serving cell, which currently performs main transmission/reception, reception power of a CSI-RS of the neighboring cell is weaker than that of the serving cell. Therefore, if the serving cell and the neighboring cell simultaneously transmit CSI-RSs through the same time-frequency resource, the relevant user has difficulty in properly detecting the CSI-RS from the neighboring cell.

Accordingly, aspects of the present invention provide a scheme, in which a CSI-RS is allocated (or mapped) and the allocated (or mapped) CSI-RS is then transmitted in such a manner that each cell may have orthogonality (in the CoMP) or quasi-orthogonality (in a non-CoMP) with respect to time-frequency resources, and thereby it is possible to reduce performance degradation caused by interference between neighboring cells.

Figure 8:
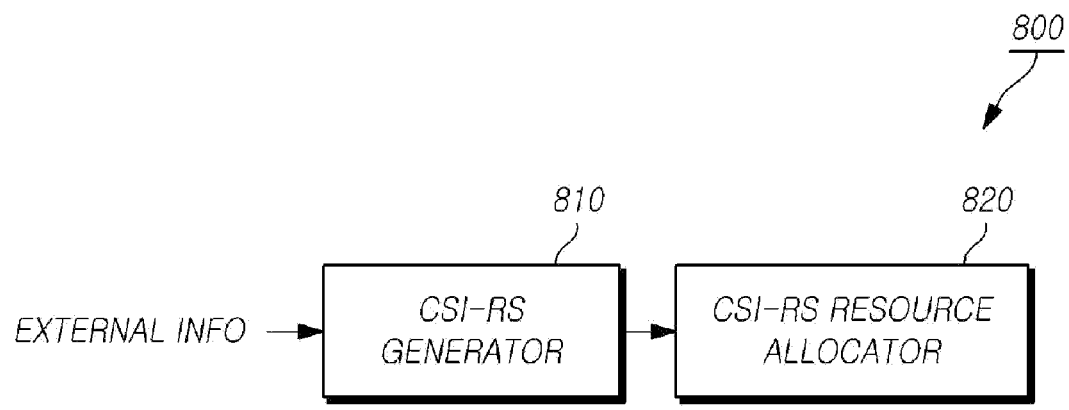
FIG. 8 is a block diagram illustrating the configuration of a CSI-RS allocation apparatus to generate a CSI-RS and to allocate the generated CSI-RS to Resource Elements (REs) according to an exemplary embodiment of the present invention.

FIG. 8 is a block diagram illustrating the configuration of a CSI-RS allocation apparatus to generate a CSI-RS and to allocate the generated CSI-RS to Resource Elements (REs) according to an exemplary embodiment of the present invention. Referring to FIG. 8, a CSI-RS allocation apparatus 800 according to an exemplary embodiment includes a CSI-RS generator 810 and a CSI-RS resource allocator 820.

The CSI-RS generator 810 receives external information, such as system-specific information, and generates a CSI-RS or a CSI-RS sequence based on the received external information. At this time, the system-specific information may include at least one of BS information (e.g., cell IDs), relay node information, UE information, subframe numbers, slot numbers, OFDM symbol numbers, and CP sizes. However, aspects of the system-specific information are not limited to this configuration. Meanwhile, the BS (or cell) information, for example, may be BS antenna information, BS bandwidth information, and/or BS cell ID information.

For example, the CSI-RS generator 810 determines a length of a sequence by using system-specific information, such as antenna or bandwidth information of a BS, and receives cell ID information and selects a CSI-RS of the relevant cell ID, which has been previously determined.

The CSI-RS resource allocator 820 receives the system-specific information and frame timing information, and allocates CSI-RSs according to antenna ports, which have been generated by the CSI-RS generator 810, to a time-frequency resource region. Thereafter, the CSI-RSs allocated to REs are multiplexed with BS transmission frames.

The CSI-RS resource allocator 820 performs allocates resources of an OFDM symbol (i.e., the x-axis) and a subcarrier location (i.e., the y-axis) by predetermined rules in a resource allocation method for CSI-RSs, and multiplexing allocated resources with BS transmission frames at specific frame timing.

Meanwhile, when allocating a CSI-RS for each of a maximum of 8 antenna ports to a time-frequency domain, the CSI-RS resource allocator 820, according to aspects of the present invention, allocates CSI-RSs according to antenna ports to 4 REs or subcarriers on a basis of a single symbol (or symbol axis) in a single subframe or Resource Block (RB). At this time, the CSI-RS resource allocator 820 may allocate the CSI-RSs in such a manner that a distance between neighboring CSI-RS allocation REs or subcarriers may become as long as 3 REs or subcarriers.

In other words, the CSI-RS resource allocator further includes that; the CSI-RS resource allocator maps the CSI-RS sequence to REs corresponding to one sub-carrier at every 12 sub-carriers for each antenna port with respect to two OFDM symbols within a sub-frame by which the CSI-RS is transmitted, for $\lceil N/2 \rceil$ antenna port sets, each of which includes either both an $M^{th}$ ($M \leq N$, and M being an odd number) antenna port and an $(M+1)^{th}$ antenna port or only the $M^{th}$ antenna port if the $(M+1)^{th}$ antenna port does not exist and is used as an antenna port set for transmission of the CSI-RS, a CSI-RS of antenna ports within each of the antenna port sets is allocated to REs having the same time-frequency resource and are discriminated from each other by orthogonal codes, and the CSI-RS allocated for two adjacent antenna port sets within a resource block are spaced apart from each other with an interval of 3 REs in the frequency axis.

A more detailed description will be made as follows. When allocating a CSI-RS for each of a maximum of 8 antenna ports to a time-frequency domain in a first scheme, the CSI-RS resource allocator 820, according to aspects of the present invention, allocates CSI-RSs to 2 symbols (or symbol axes) in a single subframe. At this time, the CSI-RS resource allocator 820 individually allocates a CSI-RS for each of a total of the 8 antenna ports to a single RE in a first subframe. Other than this, the CSI-RS resource allocator 820 distinguishes CSI-RSs according to antenna ports excluding the previously-allocated antenna ports from CSI-RSs according to the previously-allocated antenna ports by using the Orthogonal Cover Code (OCC), and duplicately allocates each of the distinguished CSI-RSs according to the antenna ports to 2 REs in a first subframe. The first scheme, which has been applied to the first subframe, is similarly applied to another or second subframe to which a CSI-RS for each of a total of the 8 antenna ports is to be allocated. The first scheme will be described in further detail referring to FIGS. 10 to 12 (individual allocation of a CSI-RS for each of the 8 antenna ports to a single RE) and FIG. 16 (duplicate allocation of each pair of the distinguished CSI-RSs according to the 8 antenna ports to 2 REs).

When allocating a CSI-RS for each of a maximum of 8 antenna ports to a time-frequency domain in a second scheme, the CSI-RS resource allocator 820, according to aspects of the present invention, allocates CSI-RSs to 2 symbols (or symbol axes) in a single subframe. At this time, the CSI-RS resource allocator 820 individually allocates a CSI-RS for each of a total of 4 antenna ports to 2 REs in a first subframe. However, the CSI-RS resource allocator 820 may distinguish CSI-RSs according to antenna ports excluding the previously-allocated antenna ports from CSI-RSs according to the previously-allocated antenna ports by using the Orthogonal Cover Code (OCC), and may duplicately allocate each of the distinguished CSI-RSs according to the antenna ports to 4 REs in a first subframe. The second scheme, which has been applied to the first subframe, is similarly applied to another or second subframe to which a CSI-RS for each of the remaining 4 antenna ports excluding the 4 antenna ports allocated to the first subframe is to be allocated. The second scheme will be described in further detail referring to FIGS. 13 to 15 (individual allocation of a CSI-RS for each of the 4 antenna ports to 2 REs) and FIG. 17 (duplicate allocation of each pair of the distinguished CSI-RSs according to the 4 antenna ports to 4 REs).

Also, a CSI-RS for a particular antenna port may be allocated in such a manner as to have frequency shifts in the direction of the frequency axis according to cells (or cell groups). Particularly, a CSI-RS for the same antenna port can be allocated in such a manner as to have shifts on a basis of a single subcarrier or RE in the direction of the frequency axis according to 3 cells (or cell groups). Accordingly, the cells (or cell groups) can have perfectly-distinguished CSI-RS allocation patterns, respectively.

Also, locations of the first and second frames as described above can be differently allocated in a radio frame for each cell (or cell group).

Meanwhile, in the first scheme as illustrated in FIGS. 10 to 12 and FIG. 16, numbers of antenna ports allocated CSI-RSs may be arranged on the same symbol (or symbol axis) in such a manner so as to alternate in the direction of the frequency axis. Also, a CSI-RS for the same antenna port can be allocated in such a manner that a shift between 2 REs respectively belonging to the first and second subframes, each of which is allocated a CSI-RS for the same antenna port, may become as long as 6 REs or subcarriers. However, aspects are not limited thereto.

An example, in which the CSI-RS allocation apparatus 800 according to an exemplary embodiment is used for a wireless communication system using OFDM and MIMO, will be described as follows.

Figure 9:
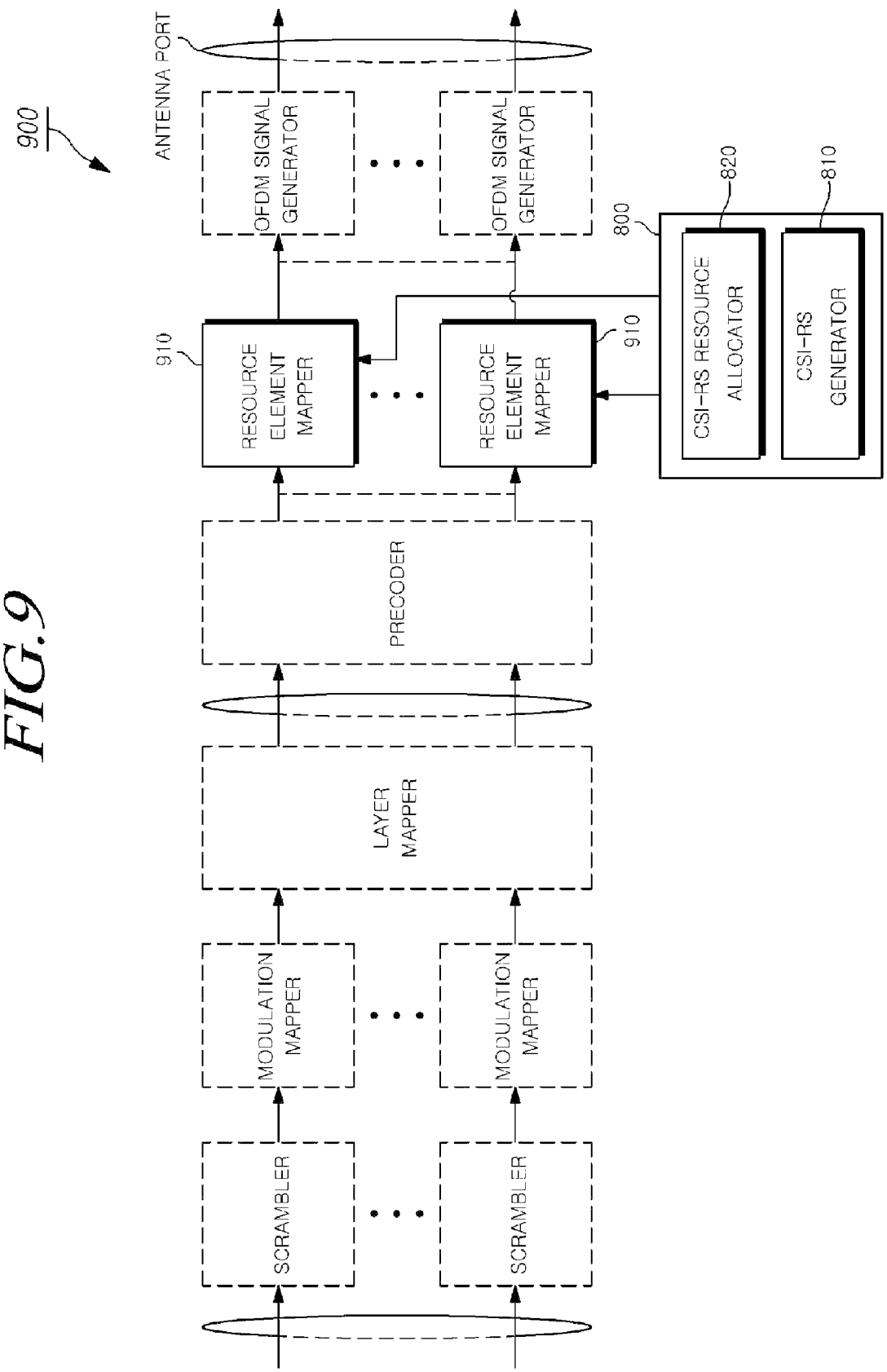
FIG. 9 is a block diagram illustrating the structure for signal generation of a downlink physical channel in a wireless communication system according to an exemplary embodiment.

FIG. 9 is a block diagram illustrating the structure for signal generation of a downlink physical channel in a wireless communication system according to an exemplary embodiment.

Referring to FIG. 9, a wireless communication system 900, according to an exemplary embodiment, includes a resource element mapper 910 and a CSI-RS allocation apparatus 800. The CSI-RS allocation apparatus 800 may include a CSI generator 810 and a CSI-RS resource allocator 820.

Meanwhile, the wireless communication system 900, shown in dotted lines, may further include a scrambler, a modulation mapper, a layer mapper, a precoder, an OFDM signal generator, etc., which are elements of a basic transmission apparatus in a Base Station (BS). However, aspects of the present invention as described above are not limited thereto.

Further, the wireless communication system 900 may be a communication system of the BS 10 as illustrated in FIG. 1.

A basic operation of the wireless communication system 900 will be described as follows. Bits, which go through channel coding and are input in the form of code words in a downlink, are scrambled by the scrambler, and are then input to the modulation mapper. The modulation mapper modulates the scrambled bits to a complex modulation symbol. Then, the layer mapper maps the complex modulation symbol to a single transmission layer or multiple transmission layers. Then, the precoder precodes the complex modulation symbol over each transmission channel of an antenna port. Thereafter, the resource element mapper maps the complex modulation symbol for each antenna port to a relevant resource element.

The CSI-RS generator 810 generates a CSI-RS, and provides the generated CSI-RS to the CSI-RS resource allocator 820. Then, the CSI-RS resource allocator 820, individually or in connection with the resource element mapper, allocates CSI-RSs according to antenna ports to a time-frequency domain in the scheme as described above, and multiplexes the allocated CSI-RSs with BS transmission frames at a specific timing.

At this time, the CSI-RS resource allocator 820 may first allocate RSs, which include the CSI-RSs according to the antenna ports, and control signals to resource elements, and may allocate data received from the precoder to the remaining resource elements.

Thereafter, the OFDM signal generator generates a complex time domain OFDM signal for each antenna port, and transmits the generated complex time domain OFDM signal through the relevant antenna port.

Although the CSI-RS allocation apparatus 800 and the resource element mapper 910 are described and shown separately, aspects are not limited thereto such that the CSI-RS allocation apparatus 800 and the resource element mapper 910 may be implemented by integrating them in an aspect of hardware or software according to exemplary embodiments of the present invention.

The structure for signal generation of the downlink physical channel in the wireless communication system, according to aspects of the present invention, has been described as above with reference to FIG. 9. However, aspects of the present invention are not limited thereto. Namely, in the structure for signal generation of the downlink physical channel in the wireless communication system, according to aspects of the present invention, other elements, which are different from the elements as described above, may be omitted, the elements may be replaced or changed with other elements, or other elements may be further included.

Figure 10:
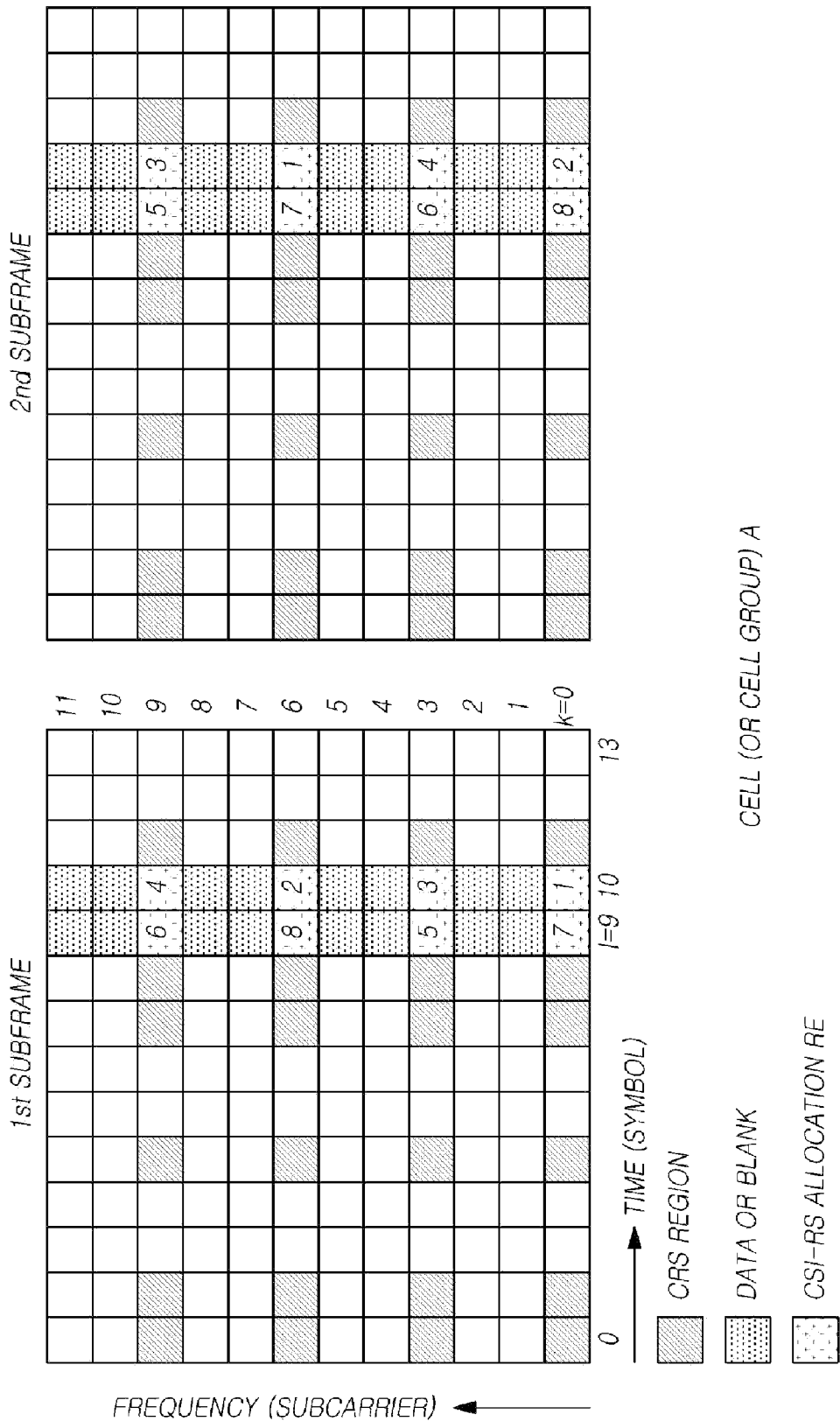
FIGS. 10 to 12 are illustrative views showing a scheme for allocating CSI-RSs according to an exemplary embodiment of the present invention.
Figure 11:
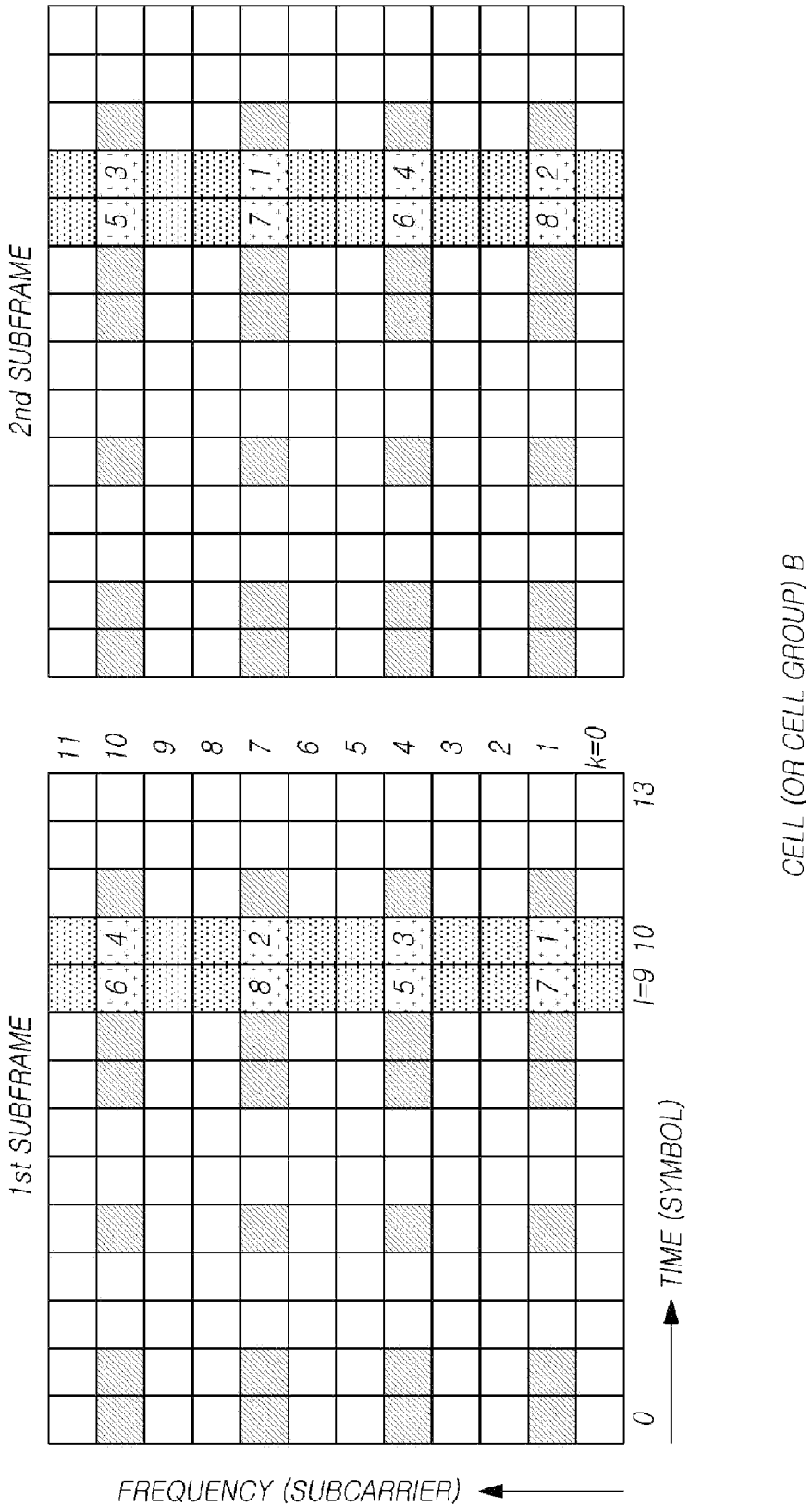
Figure 12:
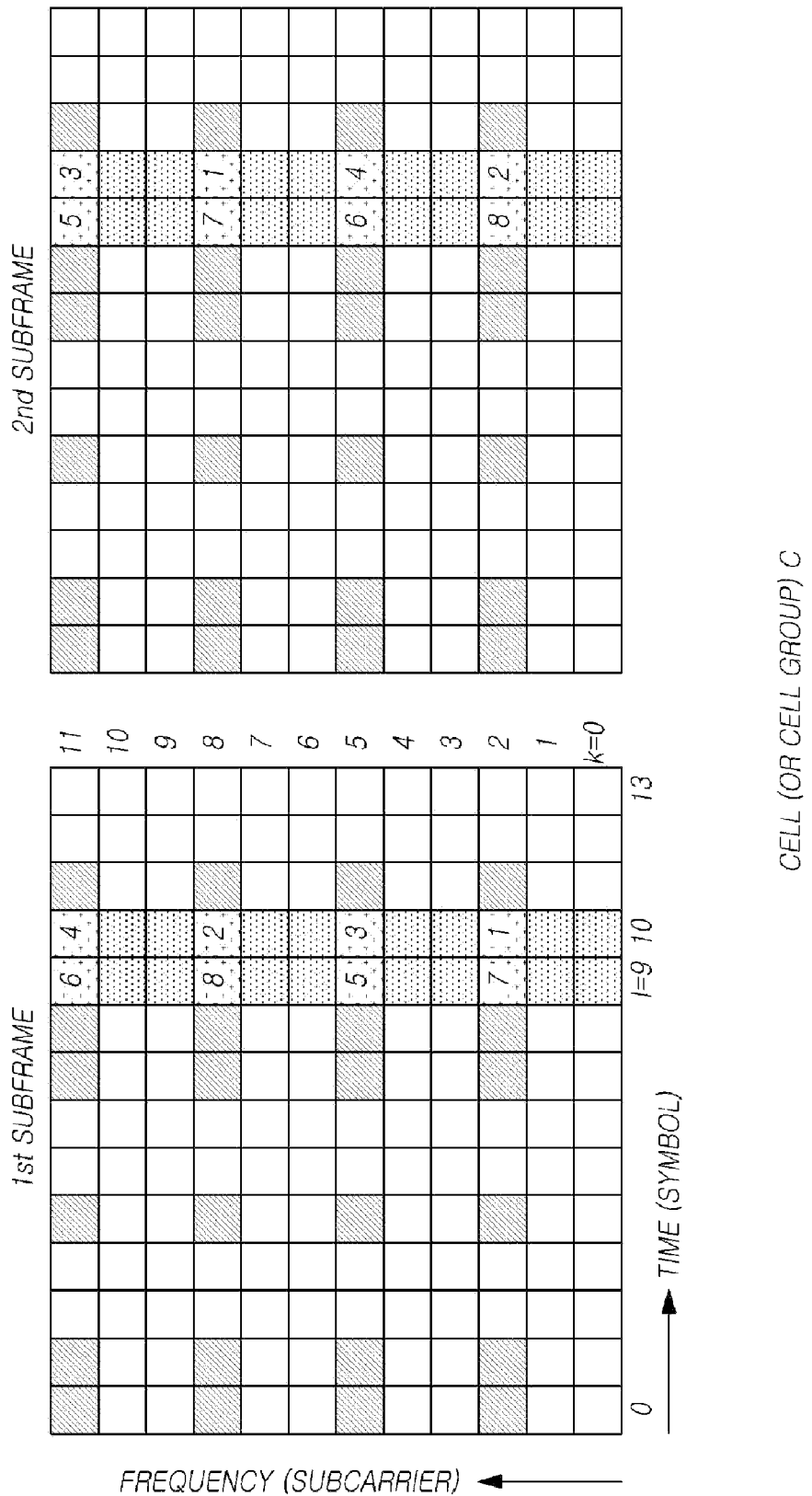

FIGS. 10 to 12 are illustrative views showing a scheme for allocating CSI-RSs in a (FDM+TDM) scheme by a CSI-RS allocation apparatus according to an exemplary embodiment of the present invention for cells (or cell groups) A, B, and C, respectively.

When allocating a CSI-RS for each of a maximum of 8 antenna ports to a time-frequency domain in an exemplary embodiment as illustrated in FIG. 10, the CSI-RS allocation apparatus can individually allocate a CSI-RSs for each of 4 antenna ports to a single RE or subcarrier within a first symbol (or symbol axis) in a first subframe or resource block. Therefore, a CSI-RS for each of the 4 different antenna ports is allocated to one of 4 REs. Then, the CSI-RS allocation apparatus can individually allocate a CSI-RS for each of remaining 4 antenna ports, which are not allocated to the first symbol (or symbol axis), to a single RE within a second symbol (or symbol axis) in the same subframe.

Therefore, CSI-RSs according to different antenna ports are allocated to CSI-RS allocation REs, which are adjacent within the first and second symbols (or symbol axes), respectively. A distance between the CSI-RS allocation REs may be as long as 3 REs or carriers in the direction of the frequency axis.

Herein, an RE, which is allocated a CSI-RS for a particular antenna port, will be referred to as a "CSI-RS allocation RE."

Namely, in exemplary embodiments as illustrated in FIGS. 10 to 12, a CSI-RS for each of 4 antenna ports is individually allocated to one of 4 REs corresponding to 4 subcarriers among 12 subcarriers along the frequency axis within a single symbol axis in a single Resource Block (RB). At this time, a distance between a CSI-RS allocation RE allocated to each antenna port and a neighboring CSI-RS allocation RE may be as long as 3 subcarriers.

A CSI-RS for each of remaining 4 antenna ports is individually allocated to another symbol axis in the scheme as described above. In this case, a CSI-RS for each of a total of 8 antenna ports is allocated to a single RE in a single subframe. The CSI-RSs are allocated to 2 subframes among a total of 10 subframes in the scheme as described above in consideration of CSI-RS allocation overhead (such that a CSI-RS for each antenna port should be allocated to 2 REs in a single radio frame). However, if the CSI-RS allocation overhead is changed, aspects of the present invention are not limited thereto. However, a scheme for CSI-RS allocation in a single subframe may be the same even if the CSI-RS allocation overhead is changed.

The CSI-RS mapping or allocation scheme according to aspects of the present invention as described above can be defined by equation (1) below. However, equation (1) expresses a representative example for purposes of understanding, and may be differently expressed while maintaining the basic scheme as described above.

$$k = 12 \cdot m + (v + v_{shift}) \bmod 12 \quad (1)$$

$$l = \begin{cases} 10 & \text{if } CSI\text{-}RS \text{ antenna ports} = 1, 2, 3, 4 \\ 9 & \text{if } CSI\text{-}RS \text{ antenna ports} = 5, 6, 7, 8 \end{cases}$$

where m=0, 1, 2, ..., $N_{RB}^{DL}-1$, $$v = \begin{cases} 0 & \text{if } CSI\text{-}RS \text{ antenna ports} = 1, 7 \text{ and } \lfloor n_s/2 \rfloor = 1 \\ 6 & \text{if } CSI\text{-}RS \text{ antenna ports} = 2, 8 \text{ and } \lfloor n_s/2 \rfloor = 1 \\ 3 & \text{if } CSI\text{-}RS \text{ antenna ports} = 3, 5 \text{ and } \lfloor n_s/2 \rfloor = 1 \\ 9 & \text{if } CSI\text{-}RS \text{ antenna ports} = 4, 6 \text{ and } \lfloor n_s/2 \rfloor = 1 \\ 6 & \text{if } CSI\text{-}RS \text{ antenna ports} = 1, 7 \text{ and } \lfloor n_s/2 \rfloor = 6 \\ 0 & \text{if } CSI\text{-}RS \text{ antenna ports} = 2, 8 \text{ and } \lfloor n_s/2 \rfloor = 6 \\ 9 & \text{if } CSI\text{-}RS \text{ antenna ports} = 3, 5 \text{ and } \lfloor n_s/2 \rfloor = 6 \\ 3 & \text{if } CSI\text{-}RS \text{ antenna ports} = 4, 6 \text{ and } \lfloor n_s/2 \rfloor = 6 \end{cases},$$

and $$v_{shift} = N_{ID}^{cell} \bmod 12.$$

Herein, k represents a subcarrier number of an RE allocated a CSI-RS. l of an RE allocated a CSI-RS represents symbol (or symbol axis) numbers 0 to 13. $\lfloor n_s/2 \rfloor$ represents subframe numbers 0 to 9.

$\lfloor n_s/2 \rfloor$ represents a subframe number, and is described as having a value of 1 or 6. However, aspects of the present invention are not limited thereto. $\lfloor n_s/2 \rfloor$ may indicate 2 optional subframes among 10 subframes included in a single radio frame.

Also, equation (1) defines l of an RE allocated a CSI-RS to have 9 or 10 as a symbol (or symbol axis) number. However, aspects of the present invention are not limited thereto. Two optional symbols (or symbol axes), which are adjacent or not adjacent, may be used among a total of 14 symbols or symbol axes if a normal CP is used, and if an extended CP is used, the number of symbols or symbol axes may be 12 or 6.

Also, as in FIG. 10 and equation (1), 4 antenna ports, which are allocated to each of the first and second symbols (or symbol axes) defined as l=9 and 10, are grouped into antenna port numbers 5 to 8 and antenna port numbers 1 to 4. However, aspects of the present invention are not limited thereto. It is also possible to group the 8 antenna ports in other schemes.

Also, if CSI-RS allocation REs for the 4 antenna ports 5 to 8 are arranged within the first symbol (or symbol axis), adoption can be made of a scheme in which the CSI-RS allocation REs are not arranged in order but are alternately arranged one by one. Namely, if a CSI-RS for the antenna port 7 is allocated to an RE located at (l, k)=(9, 0) as in FIG. 10 and equation (1), an RE located at (l, k)=(9, 3), which is adjacent along the frequency axis (i.e., distant by 3 REs), is not allocated the antenna port 6 but a CSI-RS for the antenna port 5, which is the next antenna port. Then, a CSI-RS for the antenna port 8 may be allocated to an RE located at (l, k)=(9, 6).

CSI-RS allocation REs for neighboring antenna ports are alternately arranged one by one in the scheme as described above, and thereby interference between antenna ports can be reduced. However, aspects of the present invention are not limited thereto.

If a single radio frame includes 2 subframes allocated CSI-RSs as described above and the 2 subframes are defined as first and second subframes, a shift between CSI-RS allocation REs for a particular antenna port in the first and second subframes may be as long as 6 REs as illustrated in FIG. 10.

Namely, if the antenna port 1 is taken as an example, a CSI-RS allocation RE for the antenna port 1 is located at (l, k)=(10, 0) in the first subframe as illustrated in FIG. 10. On the other hand, a CSI-allocation RE for the antenna port 1 is allocated to (l, k)=(10, 6), which is shifted as long as 6 subcarriers or REs in the direction of the frequency axis, in the second subframe.

Interference between antenna ports can be decreased in the scheme as described above. However, aspects of the present invention are not limited thereto.

The first and second subframes may be optional in determining the locations thereof but may have an appropriate distance therebetween within a single radio frame. For example, if numbers of subframes included in the radio frame are defined to be 0 to 9 and the first subframe is located at the subframe number 1, the second subframe is arranged at the subframe number 6 among the subframe numbers. However, aspects of the present invention are not limited thereto, and the first and second subframes may be adjacent or arranged differently.

Namely, CSI-RSs are allocated to 2 subframes among a total of 10 subframes in consideration of CSI-RS allocation overhead. The 2 subframes may be continuous or may have a specific period. Namely, the 2 subframes having similar configurations are transmitted in the scheme of FIG. 10. Therefore, the 2 subframes may be transmitted at intervals of 5 ms, which is obtained by dividing a total of 10 ms by 2.

Alternate CSI-RS allocation between cells (or cell groups) will be described referring to FIGS. 11 and 12 based on FIG. 10.

According to FIGS. 11 and 12 and equation (1), a scheme for CSI-RS allocation for each antenna port may be similar to as illustrated in FIG. 10, and a CSI-RS for each antenna port can be allocated in such a scheme as to have offsets or frequency shifts according to cells (or cell groups).

In other words, if multiple resource blocks are included, each antenna port allocates a CSI-RS to each $12^{th}$ subcarrier and transmits each $12^{th}$ subcarrier allocated the CSI-RS in view of the entire frequency axis.

Referring to FIG. 10, the CSI-RS antenna port 1, for example, is mapped to each $(k=12\cdot m)^{th}$ (m=0, 1, 2, ..., $N_{RB}^{DL}-1$) subcarrier within the $11^{th}$ symbol (having a symbol number 10) in a particular subframe. Herein, $N_{RB}^{DL}$ is a value obtained by representing a downlink bandwidth on a RB-by-RB basis. Also, a total 12 of 0 to 11 offsets or frequency shifts according to cell groups may be expressed by $k=12\cdot m + v_{shift}$ (m=0, 1, 2, ..., $N_{RB}^{DL}-1$).

At this time, there may be different values of $v_{shift}$ according to the cells (or cell groups). For example, $v_{shift}$ may be expressed by $v_{shift} = N_{ID}^{cell} \bmod 12$ according to Physical Cell Identities (PCIs), which are cell IDs.

If the 12 offsets or frequency shifts are also applied to each of other antenna ports according to PCIs in the above scheme, a distance between CSI-RSs allocated for each of antenna ports may be as long as 3 subcarriers. Therefore, a total of 3 cell groups (a cell group A: $N_{ID}^{cell} \bmod 3=0$, a cell group B: $N_{ID}^{cell} \bmod 3=1$, and a cell group C: $N_{ID}^{cell} \bmod 3=2$) have perfectly-distinguished CSI-RS allocation patterns with respect to time-frequency resources, respectively.

If the antenna port 7 is taken as an example, the CSI-RS allocation patterns signify a scheme in which the antenna port 7 is allocated to (l, k)=(9, 0) (FIG. 10 and mod 3=0) in the cell group A, but the antenna port 7 is allocated to (l, k)=(9, 1) (FIG. 11 and $N_{ID}^{cell} \bmod 3=1$) in the cell group B, and the antenna port 7 is allocated to (l, k)=(9, 2) (FIG. 12 and $N_{ID}^{cell} \bmod 3=2$) in the cell group C.

Also, the locations of the first and second subframes may be differently arranged for each cell group. In other words, in FIGS. 10 to 12, offsets or frequency shifts according to cell groups may be applied to a location of CSI-RS allocation in the direction of the frequency axis for each antenna port in a single subframe, and thereby CSI-RS allocation patterns may be differently defined among neighboring cells. However, further, subframes allocated CSI-RS s may be made different for each neighboring cell.

For example, when the $2^{nd}$ and $7^{th}$ subframes, which have been allocated CSI-RSs, among 10 subframes have been transmitted by a particular cell group, the $3^{rd}$ and $8^{th}$ subframes are transmitted by another cell group. By making the relative locations of the first and second subframes different for each cell group in this manner, interference between neighboring cells may be further reduced.

Also, a CSI-RS allocation RE for each of 8 antenna ports is arranged in the first subframe. Therefore, (the number of CSI-RS allocation REs for each antenna port×the number of antenna ports) can be defined as (1×8) on a subframe-by-subframe basis. There may be a total of 2 subframes, which satisfy the above definition, including the first subframe. Accordingly, (the number of CSI-RS allocation REs for each antenna port×the number of antenna ports) is equal to (2×8) on a radio frame-by-radio frame basis. Hence, a required CSI-RS allocation overhead is satisfied.

In a cooperative multi-antenna transmission/reception system, such as a CoMP, in which a User Equipment (UE) should receive a CSI-RS of a cell other than a serving cell, the UE may perform blanking for leaving data blank without transmitting the data or muting for transmitting data with zero power with respect to REs through which CSI-RSs are transmitted by a cell group other than a cell group, to which the UE and the serving cell belong, among a total of 3 cell groups.

Namely, in FIG. 10, the cell group A does not transmit data or transmits data with zero power to REs located at (l, k)=(9 or 10, 1 or 2), through which the cell groups B and C transmit CSI-RSs, so that there may exist a perfect orthogonality between cells in the 3 cell groups. Accordingly, interference between neighboring cells may be decreased. Further, this may be referred to as an orthogonal state for each cell.

However, in this case, CSI-RS allocation overhead increases by leaving the place blank instead of the existing transmission of data. Then, the increased CSI-RS allocation overhead reduces a data transmission rate.

Therefore, in a non-CoMP communication system in which a UE does not need to receive a CSI-RS of a cell other than a serving cell, in order not to cause the increase of CSI-RS allocation overhead, the UE considers interference to some degree, which is caused by data, and may transmit data to REs through which CSI-RSs are transmitted by a cell group other than a cell group, to which the UE and the serving cell belong, among a total of 3 cell groups. This can be referred to as a quasi-orthogonal state for each cell.

However, even though there exists the quasi-orthogonality between cells in the 3 cell groups, cell groups corresponding to neighboring cells do not simultaneously transmit CSI-RSs through the same time-frequency resource. Therefore, it is possible to reduce performance degradation caused by interference between the neighboring cells.

Figure 13:
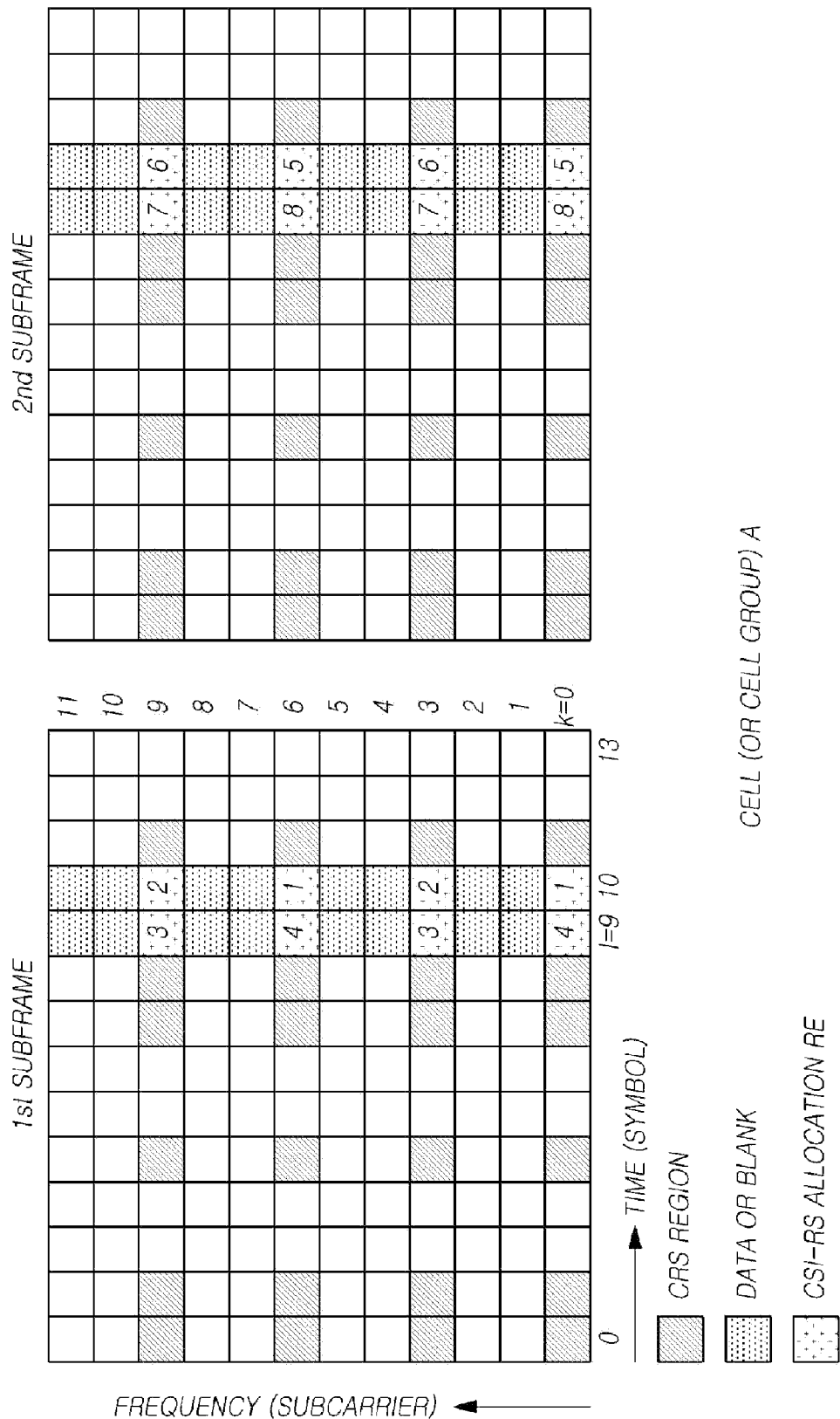
FIGS. 13 to 15 are illustrative views showing a scheme for allocating CSI-RSs according to an exemplary embodiment of the present invention.
Figure 14:
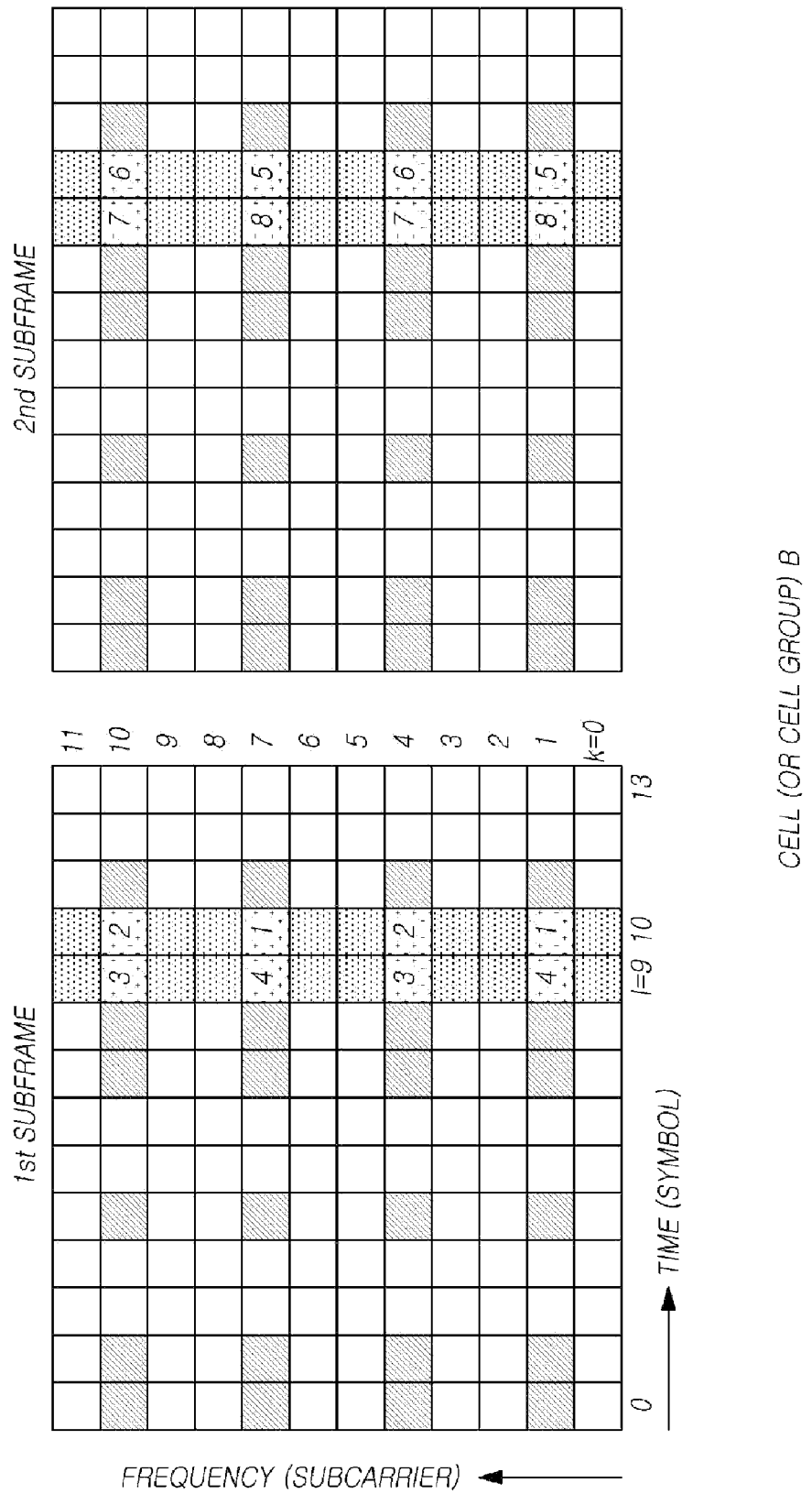
Figure 15:
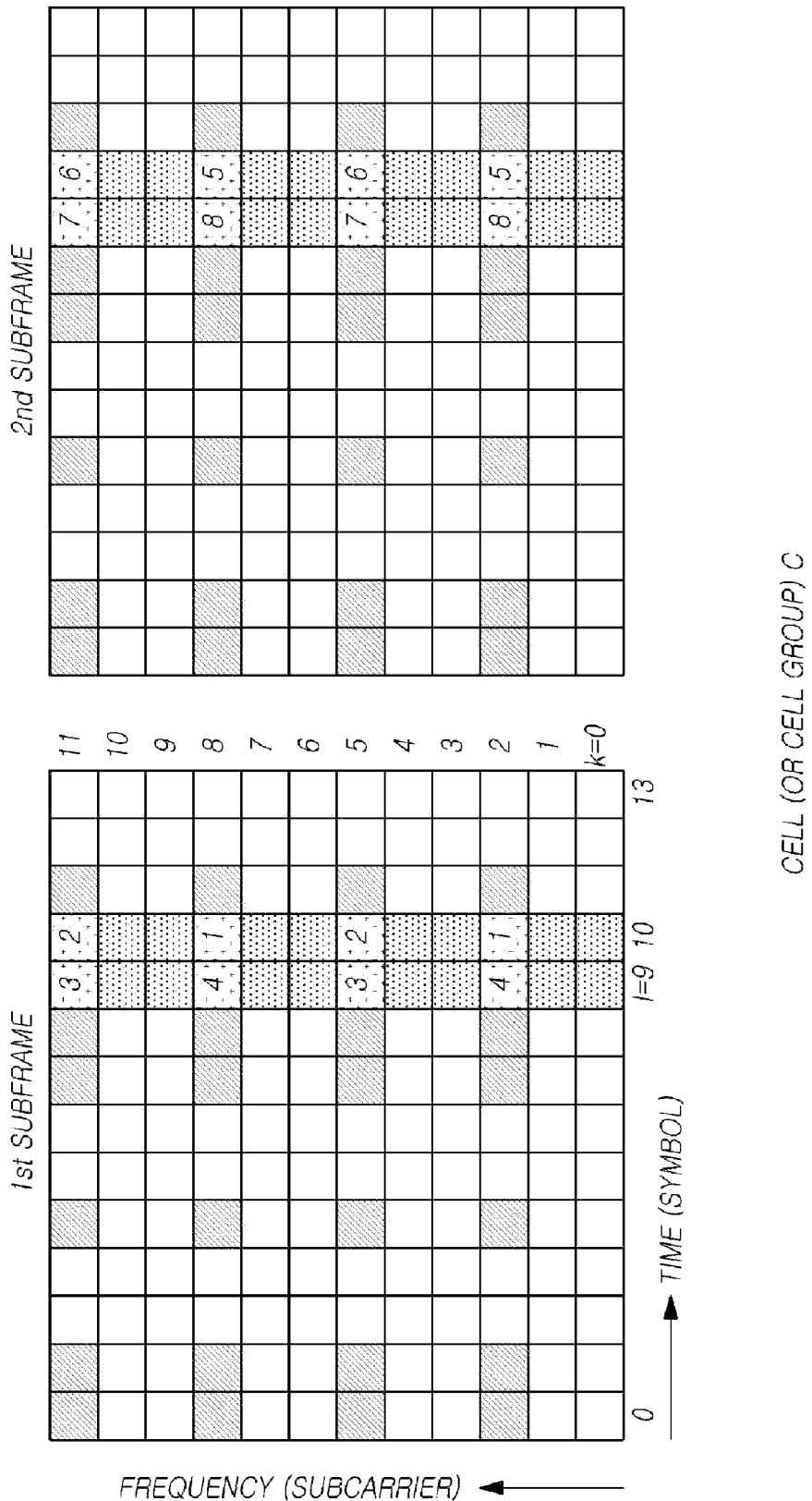

FIGS. 13 to 15 are illustrative views showing a scheme for CSI-RS allocation in (FDM+TDM) according to an exemplary embodiment of the present invention for cells (or cell groups) A, B, and C, respectively.

When a CSI-RS for each of a maximum of 8 antenna ports is allocated to a time-frequency domain in an exemplary embodiment of FIGS. 13 to 15, a CSI-RS for each of 2 antenna ports is individually allocated to 2 REs or subcarriers within a first symbol (or symbol axis) in a first subframe or Resource Block (RB). A CSI-RS for each of 2 antenna ports excluding the 2 antenna ports allocated to the first symbol (or symbol axis) is individually allocated to 2 REs within a second symbol (or symbol axis) in the same subframe. A CSI-RS for each of remaining 4 antenna ports may be allocated in another second subframe or RB in the scheme as described above.

Accordingly, each of the first and second symbols (or symbol axes) is allocated according to (the number of CSI-RS allocation REs for each antenna port×the number of antenna ports)=(2×2). A distance between CSI-RS allocation REs may be as long as 3 REs or subcarriers in the direction of the frequency axis as described with respect to FIGS. 10 to 12.

In other words, in an exemplary embodiment as shown in FIGS. 13 to 15, a CSI-RS for each of 2 antenna ports is individually allocated to 2 REs among 4 REs corresponding to 4 subcarriers within 12 subcarriers along the frequency axis within a single symbol axis in a single RB. At this time, a distance between CSI-RSs allocated according to antenna ports may be as long as 3 subcarriers.

A CSI-RS for each of 2 antenna ports excluding 2 allocated antenna ports may be individually allocated to 2 REs within another symbol axis in the scheme as described above. In this case, a CSI-RS for each of a total of the 4 antenna ports is individually allocated to 2 REs in a single subframe. A CSI-RS for each of remaining 4 antenna ports excluding 4 allocated antenna ports is allocated to 2 REs in another subframe in the scheme as described above. As a result, a CSI-RS for each antenna port may be individually allocated to 2REs in a total of 10 subframes.

The CSI-RS mapping or allocation scheme according to aspects of the present invention as described above can be defined by equation (2) below. However, equation (2) expresses a representative example for purposes of understanding, and may be differently expressed while maintaining the basic scheme as described above.

Subframe A: transmission through CSI-RS antenna ports=1, 2, 3, 4
Subframe B: transmission through CSI-RS antenna ports=5, 6, 7, 8

$$k = 6 \cdot m + (v + v_{shift}) \bmod 12 \quad (2)$$

$$l = \begin{cases} 10 & \text{if } CSI\text{-}RS \text{ antenna ports} = 1, 2, 5, 6 \\ 9 & \text{if } CSI\text{-}RS \text{ antenna ports} = 3, 4, 7, 8 \end{cases}$$

where m=0, 1, 2, ..., $2 \cdot N_{RB}^{DL} - 1$, $$v = \begin{cases} 0 & \text{if } CSI\text{-}RS \text{ antenna ports} = 1, 4, 5, 8 \\ 3 & \text{if } CSI\text{-}RS \text{ antenna ports} = 2, 3, 6, 7 \end{cases},$$

and $$v_{shift} = N_{ID}^{cell} \bmod 6.$$

Herein, k represents a subcarrier number of an RE allocated a CSI-RS. l of an RE allocated a CSI-RS represents symbol (or symbol axis) numbers 0 to 13.

Also, equation (2) defines l of an RE allocated a CSI-RS to have 9 or 10 as a symbol (or symbol axis) number. However, aspects of the present invention are not limited thereto. Two optional symbols (or symbol axes), which are adjacent or not adjacent, may be used among a total of 14 symbols or symbol axes if a normal CP is used, and if an extended CP is used, the number of symbols or symbol axes may be 12 or 6.

Also, as in FIGS. 13 to 15 and equation (2), 4 antenna ports, which are allocated to the first symbol (or symbol axis)

defined as l=9, are grouped into antenna port numbers 3 and 4 in a first subframe, and are grouped into antenna port numbers 7 and 8 in a second subframe. Four antenna ports, which are allocated to the second symbol (or symbol axis) defined as l=10, are grouped into antenna port numbers 1 and 2 in a first subframe, and are grouped into antenna port numbers 5 and 6 in a second subframe. However, this is just one example, and aspects of the present invention are not limited thereto. It is also possible to group the 8 antenna ports in other schemes.

Also, when CSI-RS allocation REs for the 2 antenna ports 3 and 4 are arranged within the first symbol (or symbol axis) in the first subframe, adoption can be made of a scheme in which the CSI-RS allocation REs are alternately allocated with each other. Namely, when a CSI-RS for the antenna port 4 is allocated to an RE located at (l, k)=(9, 0) as in FIG. 13 and equation (2), a CSI-RS for the antenna port 3 is allocated to an RE located at (l, k)=(9, 3) which is adjacent along the frequency axis (i.e., distant by 3 REs). Then, a CSI-RS for the antenna port 4 is allocated to an RE located at (l, k)=(9, 6). Namely, a distance between CSI-RS allocation REs according to antenna ports may be as long as 6 REs on the symbol (or symbol axis).

CSI-RS allocation REs for neighboring antenna ports are alternately arranged one by one in the scheme as described above, and thereby interference between antenna ports can be reduced. However, aspects of the present invention are not limited thereto.

The first and second subframes may be optional in determining the locations thereof but may have an appropriate distance therebetween in a single radio frame. For example, if numbers of subframes included in the radio frame are defined to be 0 to 9 and the first subframe is located at the subframe number 1, the second subframe may be arranged at 6 among the subframe numbers. However, aspects of the present invention are not limited thereto, and the first and second subframes may be just adjacent or arranged differently.

According to an exemplary embodiment as illustrated in FIGS. 13 to 15, (the number of CSI-RS allocation REs for each antenna port×the number of antenna ports) is defined as (2×4) in each of the first and second subframes. Accordingly, (the number of CSI-RS allocation REs for each antenna port× the number of antenna ports) is equal to (2×8) on a radio frame-by-radio frame basis. In this regard, a required CSI-RS allocation overhead is satisfied.

CSI-RSs are allocated to 2 subframes among a total of 10 subframes in consideration of CSI-RS allocation overhead. The 2 subframes may be continuous or may all have a specific period. Namely, the 2 subframes having different configurations, in each of which CSI-RSs according to the 4 antenna ports are allocated, are transmitted in the scheme as illustrated in FIGS. 13 to 15. Therefore, the 2 subframes as continuous subframes may be transmitted by periods of 10 ms.

Alternate CSI-RS allocation between cells (or cell groups) will be described referring to FIGS. 14 and 15 based on FIG. 13.

According to FIGS. 14 and 15 and equation (2), a scheme for CSI-RS allocation for each antenna port may be similar to as illustrated in FIG. 13, and a CSI-RS for each antenna port can be allocated in such a scheme as to have offsets or frequency shifts according to cells (or cell groups).

In other words, if at least one resource block is included, each antenna port allocates a CSI-RS to each $6^{th}$ subcarrier and transmits each $6^{th}$ subcarrier allocated to the CSI-RS in view of the entire frequency axis. Referring to FIGS. 13 to 15, the CSI-RS antenna port 1, for example, is mapped to each $(k=6\cdot m)^{th}$ (m=0, 1, 2, . . . , $2\cdot N_{RB}^{DL}-1$) subcarrier or RE within the $11^{th}$ symbol (having a symbol number l=10) in a particular subframe. Herein, a total 6 of 0 to 5 offsets or frequency shifts according to cell groups may be expressed by $k=6\cdot m+v_{shift}$ (m=0, 1, 2, . . . , $2\cdot N_{RB}^{DL}-1$). At this time, there may be different values of $v_{shift}$ cell according to the cells. For example, $v_{shift}$ may be expressed by $v_{shift}$=mod 6 according to Physical Cell Identities (PCIs), which are cell IDs.

If the 6 offsets or frequency shifts are also applied to each of other antenna ports according to PCIs in the above scheme, a distance between CSI-RSs allocated for each of antenna ports may be as long as 3 subcarriers. Therefore a total of 3 cell groups (a cell group A of FIG. 13: $N_{ID}^{cell}$ mod 3=0, a cell group B of FIG. 14: $N_{ID}^{cell}$ mod 3=1, and a cell group C of FIG. 15: $N_{ID}^{cell}$ mod 3=2) have perfectly-distinguished CSI-RS allocation patterns with respect to time-frequency resources, respectively.

If an example of the antenna port 4 is described in detail referring to FIGS. 13 to 15, the CSI-RS allocation patterns signify a scheme in which the antenna port 4 is allocated to (l, k)=(9, 0) (FIG. 13 and $N_{ID}^{cell}$ mod 3=0) in the cell group A, but the antenna port 4 is allocated to (l, k)=(9, 1) (FIG. 14 and $N_{ID}^{cell}$ mod 3=1) in the cell group B, and the antenna port 4 is allocated to (l, k)=(9, 2) (FIG. 15 and $N_{ID}^{cell}$ mod 3=2) in the cell group C.

Also, the locations of the first and second subframes may be differently arranged for each cell group.

In other words, in FIGS. 13 to 15, offsets or frequency shifts according to cell groups are applied to a location of CSI-RS allocation in the direction of the frequency axis for each antenna port in a single subframe, and thereby CSI-RS allocation patterns are differently defined among neighboring cells. However, subframes allocated CSI-RSs may be additionally made different for each neighboring cell.

For example, when the $2^{nd}$ and $7^{th}$ subframes, which have been allocated CSI-RSs, among 10 subframes have been transmitted by a particular cell group, the $3^{rd}$ and $8^{th}$ subframes are transmitted by another cell group. By making the relative locations of the first and second subframes different for each cell group in this manner, interference between neighboring cells may be further reduced. However aspects of the present invention are not limited thereto.

In an exemplary embodiment as illustrated in FIGS. 13 to 15, (the number of CSI-RS allocation REs for each antenna port×the number of antenna ports) is defined as (2×2) on a symbol-by-symbol basis in a single subframe. In each of the first and second subframes, (the number of CSI-RS allocation REs for each antenna port×the number of antenna ports) is defined as (2×4). Accordingly, (the number of CSI-RS allocation REs for each antenna port×the number of antenna ports) is equal to (2×8) on a radio frame-by-radio frame basis. Hence, a required CSI-RS allocation overhead is satisfied.

Also, a communication system, such as a CoMP, enables blanking or muting to be performed in an exemplary embodiment of FIGS. 13 to 15, similar to described with respect to FIGS. 10 to 12.

Namely, in a cooperative multi-antenna transmission/reception system, such as a CoMP, in which a User Equipment (UE) may receive a CSI-RS of a cell other than a serving cell, the UE may perform blanking for leaving data blank without transmitting the data or muting for transmitting data with zero power with respect to REs through which CSI-RSs are transmitted by a cell group other than a cell group, to which the UE and the serving cell belong, among a total of 3 cell groups.

Namely, in FIG. 13, the cell group A does not transmit data or transmits data with zero power to REs located at (l, k)=(9 or 10, 1 or 2), through which the cell groups B and C transmit CSI-RSs, so that there may exist a perfect orthogonality between cells in the 3 cell groups. Accordingly, it is possible to decrease interference between neighboring cells. This can be referred to as an orthogonal state for each cell.

Meanwhile, in a communication system such, as a non-CoMP, in which a UE does not need to receive a CSI-RS of a cell other than a serving cell, in order not to cause the increase of CSI-RS allocation overhead, the UE considers interference to some degree, which is caused by data, and may transmit data to REs through which CSI-RSs are transmitted by a cell group other than a cell group, to which the UE and the serving cell belong, among a total of 3 cell groups. This can be referred to as a quasi-orthogonal state for each cell. However, even though there exists the quasi-orthogonality between cells in the 3 cell groups, cell groups corresponding to neighboring cells do not simultaneously transmit CSI-RSs through the same time-frequency resource. Therefore, it is possible to reduce performance degradation caused by interference between the neighboring cells.

In other words, an exemplary embodiment discloses transmitting CSI-RS, wherein the transmitting CSI-RS includes steps of generating CSI-RS sequence for N antenna ports, mapping the generated CSI-RS sequence to predetermined Resource Elements (REs); and transmitting a signal including the mapped CSI-RS sequence. Herein, the mapping the generated CSI-RS sequence to the REs further includes; grouping the N antenna ports into at least one antenna port set, and allocating that each of the at least one antenna port set includes a pair of two antenna ports, two antenna ports in the same antenna port set are allocated to identical REs of a time-frequency domain configured by symbols and sub-carriers, in a sub-carrier having an offset determined by a cell among 12 sub-carriers and consecutive two symbols within one sub-frame, the two antenna ports in the same antenna port set are discriminated from each other by Orthogonal Cover Codes (OCCs), and an interval between antenna sets are spaced by 3 in a frequency domain. And the mapping the generated CSI-RS sequence to the REs further includes; allocating that the generated CSI-RS sequence is allocated to REs from a sub-carrier having different offset by determined according to the N antenna ports, in 12 sub-carriers and two symbols and the consecutive two symbols within the one sub-frame.

Also, an exemplary embodiment discloses receiving CSI-RS, wherein the receiving CSI-RS includes steps of receiving a signal; extracting CSI-RS sequence for N antenna ports in predetermined Resource Elements (REs) of a time-frequency domain configured by symbols and sub-carriers, in a sub-carrier having an offset determined by a cell among 12 sub-carriers and consecutive two symbols within one sub-frame from the signal; acquiring channel state information by the extracted CSI-RS sequence. Herein, the extracting CSI-RS sequence further includes; determining at least one antenna port set of the N antenna ports, and determining that an interval between antenna port sets are spaced by 3 in a frequency domain, each of the at least one antenna port set includes a pair of two antenna ports, and two antenna ports in the same antenna port set are discriminated from each other by Orthogonal Cover Codes (OCCs) in identical REs among the predetermined REs. And the extracting of the CSI-RS sequence further includes; determining that the generated CSI-RS sequence is allocated to REs from a sub-carrier having different offset by determined according to the N antenna ports, in 12 sub-carriers and two symbols and the consecutive two symbols within the one sub-frame.

Figure 16:
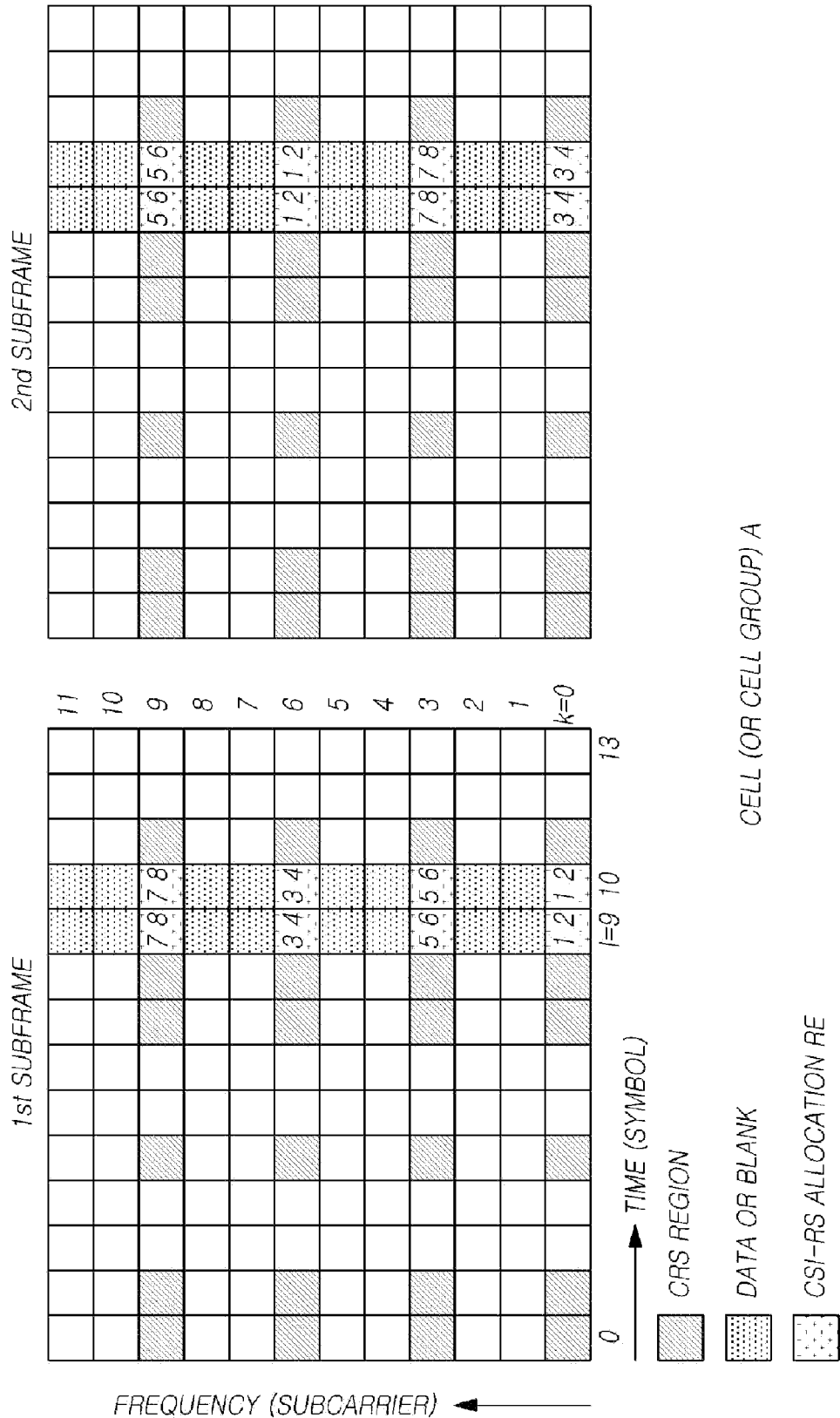
FIG. 16 is an illustrative view showing a scheme for allocating CSI-RSs according to an exemplary embodiment of the present invention.

FIG. 16 is an illustrative view showing an exemplary embodiment of a scheme for CSI-RS allocation in (FDM+CDM). When a CSI-RS for each of a maximum of 8 antenna ports is allocated to a time-frequency domain according to aspects of the present invention as shown in FIG. 16, a CSI-RS for each of the 4 antenna ports is individually allocated to a single RE or subcarrier within a first symbol (or symbol axis) in a first subframe or Resource Block (RB). Therefore, each of the 4 REs is allocated a CSI-RS of one of the 4 different antenna ports. Then, each of the CSI-RSs according to the 4 antenna ports, which have been allocated to the first symbol (or symbol axis), is equally allocated to a single RE within a second symbol (or symbol axis) in the same subframe. Consequently, a total of the 8 CSI-RS allocation REs are arranged in the first subframe or RB. Further, CSI-RSs according to the remaining 4 antenna ports are distinguished from the CSI-RSs according to the previously-allocated 4 antenna ports by the Orthogonal Cover Code (OCC) in the first subframe or RB. Then, each of the distinguished CSI-RSs according to the remaining 4 antenna ports can be duplicately allocated to 2 CSI-RS allocation REs of the 8 CSI-RS allocation REs in the first subframe or RB.

Namely, a CSI-RS for each of the 4 antenna ports is allocated to one of the 4 REs corresponding to 4 subcarriers among 12 subcarriers along the frequency axis within the first symbol in a single RB. At this time, a distance between the CSI-RSs allocated according to the 4 antenna ports may be as long as 3 subcarriers. In the same scheme as described above, a CSI-RS for each of the 4 equal antenna ports is allocated to one of the 4 REs within the second symbol (or symbol axis) in the same RB. In this case, a CSI-RS for each of a total of the 4 antenna ports is duplicately allocated to the 2 symbols in a single subframe. CSI-RSs according to the remaining 4 antenna ports are distinguished from the CSI-RSs according to the previously-allocated 4 antenna ports by different codes, such as the OCC, which have orthogonality, in the same subframe. For example, the CSI-RS antenna ports 1 and 2 are mapped to the same RE in the same subframe, and the same RE, which is allocated the CSI-RSs according to the CSI-RS antenna ports 1 and 2, is transmitted. If the CSI-RSs according to the CSI-RS antenna ports 1 and 2 are allocated to the same RE, the CSI-RSs are distinguished by the OCC. The scheme as described above is similarly applied to the antenna ports 3 and 4, 5 and 6, and 7 and 8. The CSI-RSs are allocated to the 2 subframes among a total of 10 subframes according to this scheme in consideration of CSI-RS allocation overhead. However, if the CSI-RS allocation overhead is changed, aspects of the present invention are not limited thereto. However, according to aspects of the present invention, a scheme for CSI-RS allocation in a single subframe may be the same even when the CSI-RS allocation overhead is changed.

Referring to FIG. 16, the above allocation scheme will be described in detail as follows. CSI-RSs according to the antenna ports 1 and 2 distinguished by the OCC are duplicately allocated to 2 REs located at (l, k)=(9 and 10, 0) in the first subframe. CSI-RSs according to the antenna ports 5 and 6 distinguished by the OCC are duplicately allocated to 2 REs located at (l, k)=(9 and 10, 3) which is as distant as 3 REs from the location (9 and 10, 0) in the direction of the frequency axis.

Also, in order to satisfy the requirements of CSI-RS allocation overhead, CSI-RSs may be allocated even to another or second subframe in the scheme applied to the first subframe.

At this time, there may be changes in numbers of antenna ports of which CSI-RSs are duplicately allocated to the same RE, the order of antenna port numbers in the direction of the frequency axis, etc. However, this is not essential, and aspects of the present invention are not limited thereto.

The CSI-RS mapping or allocation scheme according to aspects of the present invention as described above can be defined by equation (3) below. However, equation (3)

expresses a representative example for purposes of understanding of this embodiment, and may be differently expressed while maintaining the basic scheme as described above.

CSI-RS antenna ports=1, 3, 5, 7: OCC [+1, +1]
CSI-RS antenna ports=2, 4, 6, 8: OCC [+1, −1]

$$k = 12 \cdot m + (v + v_{shift}) \bmod 12 \quad (3)$$

$$l = 9, 10$$

$$m = 0, 1, 2, \ldots, N_{RB}^{DL} - 1$$

$$v = \begin{cases} 0 & \text{if } CSI\text{-}RS \text{ antenna ports} = 1, 2 \text{ and } \lfloor n_s/2 \rfloor = 1 \\ 6 & \text{if } CSI\text{-}RS \text{ antenna ports} = 3, 4 \text{ and } \lfloor n_s/2 \rfloor = 1 \\ 3 & \text{if } CSI\text{-}RS \text{ antenna ports} = 5, 6 \text{ and } \lfloor n_s/2 \rfloor = 1 \\ 9 & \text{if } CSI\text{-}RS \text{ antenna ports} = 7, 8 \text{ and } \lfloor n_s/2 \rfloor = 1 \\ 6 & \text{if } CSI\text{-}RS \text{ antenna ports} = 1, 2 \text{ and } \lfloor n_s/2 \rfloor = 6 \\ 0 & \text{if } CSI\text{-}RS \text{ antenna ports} = 3, 4 \text{ and } \lfloor n_s/2 \rfloor = 6 \\ 9 & \text{if } CSI\text{-}RS \text{ antenna ports} = 5, 6 \text{ and } \lfloor n_s/2 \rfloor = 6 \\ 3 & \text{if } CSI\text{-}RS \text{ antenna ports} = 7, 8 \text{ and } \lfloor n_s/2 \rfloor = 6 \end{cases}$$

and $$v_{shift} = N_{ID}^{cell} \bmod 12$$

Herein, k represents a subcarrier number of an RE allocated a CSI-RS. l of an RE allocated a CSI-RS represents symbol (or symbol axis) numbers 0 to 13. $\lfloor n_s/2 \rfloor$ represents subframe numbers 0 to 9.

Herein, $\lfloor n_s/2 \rfloor$ represents a subframe number, and is described as having a value of 1 or 6. However, aspects of the present invention are not limited thereto. $\lfloor n_s/2 \rfloor$ may indicate 2 optional subframes among 10 subframes included in a single radio frame.

Also, equation (3) defines l of an RE allocated a CSI-RS to have 9 or 10 as a symbol (or symbol axis) number. However, aspects of the present invention are not limited thereto. Two optional symbols (or symbol axes), which are adjacent or not adjacent, may be used among a total of 14 symbols or symbol axes if a normal CP is used, and if an extended CP is used, the number of symbols or symbol axes may be 12 or 6.

Further, as described above, numbers of antenna ports of which CSI-RSs are duplicately allocated to the same RE, the order of antenna port numbers in the direction of the frequency axis, etc. may be changed. Aspects of the present invention are not limited to the example of FIG. 16. Namely, in FIG. 16 and equation (3), the antenna ports, which are allocated to the CSI-RS allocation REs in the first subframe, are indicated by (1, 2), (5, 6), (3, 4) and (7, 8) in the order of lower subcarriers. However, aspects of the present invention are not limited thereto.

Here, the Orthogonal Cover Code (OCC) may be an optional code system such as the 2-digit Walsh code system, in which codes have mutual orthogonality. Namely, in FIG. 16, a CSI-RS of an antenna port forward indicated within each RE, for example, is distinguished by an OCC 1, such as [1, 1], and a CSI-RS of an antenna port backward indicated within each RE, for example, is distinguished by an OCC 2, such as [1, −1], which is orthogonal to the OCC 1.

As illustrated in FIG. 16, the 2 antenna ports duplicately allocated to 2 REs may be neighboring antenna ports. Namely, in FIG. 16, the 2 antenna ports, which are duplicately allocated to (1, k)=(9 and 10, 0), are neighboring antenna ports 1 and 2.

At this time, if a set of 2 antenna ports, which are distinguished by the OCC and are duplicately allocated to 2 REs, referred to as an "antenna port set," the order of antenna port sets may be alternately allocated in the direction of the frequency axis. However, aspects of the present invention are not limited thereto. For example, if an antenna port set (1, 2) is allocated to 2 REs located at k=0 in FIG. 16, 2 REs located at k=3, which is next to k=0, are allocated not a neighboring antenna set (3, 4) but an antenna port set (5, 6) which is next to the antenna set (3, 4). Then, the antenna port set (3, 4) is allocated to 2 REs located at k=6.

The CSI-RS allocation REs for the neighboring antenna port sets may be alternately arranged one-by-one in the scheme as described above, and thereby interference between the neighboring antenna port sets can be reduced. However, aspects of the present invention are not limited thereto.

Also, in FIG. 16, there may be a difference between the first subframe (shown on the left) and the second subframe (shown on the right) in the order of antenna port sets in the direction of the frequency axis. However, aspects of the present invention are not limited thereto. For example, if the antenna port set (1, 2) is allocated to the 2 REs located at k=0 in the first subframe as illustrated in FIG. 16, the antenna port set (1, 2) may be allocated to 2 REs located not at k=0 but at k=6 in the second subframe.

The scheme as described above can decrease the interference between the antenna ports. However aspects of the present invention are not limited thereto.

The first and second subframes may be optional in determining the locations thereof but may have an appropriate distance there between in a single radio frame. For example, when numbers of subframes included in the radio frame are defined to be 0 to 9 and the first subframe is located at the subframe number 1, the second subframe is arranged at 6 among the subframe numbers. However, aspects of the present invention are not limited thereto, and the first and second subframes may be just adjacent.

Namely, CSI-RSs are allocated to 2 subframes among a total of 10 subframes in consideration of CSI-RS allocation overhead. The 2 subframes may be continuous or may have a specific period. Namely, the 2 subframes having similar configurations are transmitted in the scheme of FIG. 16. Therefore, the 2 subframes may be transmitted at intervals of 5 ms, which is obtained by dividing a total of 10 ms by 2.

Alternate CSI-RS allocation between cells (or cell groups) will be described referring to FIGS. 14 and 15 based on FIG. 13.

A scheme for alternate CSI-RS allocation between cells (or cell groups) can also be adopted in an exemplary embodiment of FIG. 16 similar to as in FIGS. 10 to 12.

Namely, according to equation (3), a scheme for CSI-RS allocation for each antenna port may be similar to as illustrated in FIG. 16, and a CSI-RS for each antenna port may be allocated in such a scheme as to have offsets or frequency shifts according to cells (or cell groups), even though such scheme is not shown in FIG. 16.

In other words, if at least one resource block is included, each antenna port allocates a CSI-RS to each $12^{th}$ subcarrier and transmits each $12^{th}$ subcarrier allocated the CSI-RS in view of the entire frequency axis. Referring to FIG. 16, the CSI-RS antenna port 1, for example, is mapped to each $(k=12 \cdot m)^{th}$ (m=0, 1, 2, ..., $N_{RB}^{DL}-1$) subcarrier within the $10^{th}$ and $11^{th}$ symbols (having symbol numbers 9 and 10) in a particular subframe. Herein, N is a value obtained by representing a downlink bandwidth on a RB-by-RB basis. Herein, a total 12 of 0 to 11 offsets or frequency shifts according to cell groups may be expressed by $k=12 \cdot m+v_{shift}$ ($m=0, 1, 2, \ldots, N_{RB}^{DL}-1$). At this time, there may be different values of $v_{shift}$ according to the cells. For example, $v_{shift}$ may be expressed by $v_{shift}=N_{ID}^{cell}$ mod 12 according to Physical Cell Identities (PCIs), which are cell IDs.

If the 12 offsets or frequency shifts are also applied to each of other antenna ports according to PCIs in the above scheme, a distance between CSI-RSs allocated for each of antenna ports may be as long as 3 subcarriers. Therefore, a total of 3 cell groups (a cell group A: $N_{ID}^{cell}$ mod 3=0, a cell group B: $N_{ID}^{cell}$ mod 3=1, and a cell group C: $N_{ID}^{cell}$ mod 3=2) have perfectly-distinguished CSI-RS allocation patterns with respect to time-frequency resources, respectively.

Namely, if the antenna port set (1, 2) is taken as an example, the CSI-RS allocation patterns signify a scheme in which the antenna port set (1, 2) is allocated to (l, k)=(9 and 10, 0) (shown on the left in FIG. 16 and $N_{ID}^{cell}$ mod 3=0) in the first subframe and to (l, k)=(9 and 10, 6) (shown on the right in FIG. 16 and $N_{ID}^{cell}$ mod 3=0) in the second subframe in the cell group A, but the antenna port set (1, 2) is allocated to (l, k)=(9 and 10, 1) ($N_{ID}^{cell}$ mod 3=1) in the first subframe and to (l, k)=(9 and 10, 7) ($N_{ID}^{cell}$ mod 3=1) in the second subframe in the cell group B (not shown), and the antenna port set (1, 2) is allocated to (l, k)=(9 and 10, 2) (Ng mod 3=2) in the first subframe and to (l, k)=(9 and 10, 8) ($N_{ID}^{cell}$ mod 3=2) in the second subframe in the cell group C (not shown).

Also, the locations of the first and second subframes may be differently arranged for each cell group.

In other words, according to aspects of the present invention, offsets or frequency shifts according to cell groups are applied to a location of CSI-RS allocation in the direction of the frequency axis for each antenna port in a single subframe, and thereby CSI-RS allocation patterns are differently defined among neighboring cells. However, further, subframes allocated CSI-RSs may be made different for each neighboring cell.

For example, when the 2$^{nd}$ and 7$^{th}$ subframes, which have been allocated CSI-RSs, among 10 subframes have been transmitted by a particular cell group, the 3$^{rd}$ and 8$^{th}$ subframes are transmitted by another cell group. By making the relative locations of the first and second subframes different for each cell group in this manner, interference between neighboring cells may be further reduced. However, aspects of the present invention are not limited thereto.

Also, a communication system, such as a CoMP, enables blanking or muting to be performed in an exemplary embodiment of FIG. 16, as described above with respect to FIGS. 10 to 12.

In order to avoid overlapping of description, a brief description will be made as follows. In a cooperative multi-antenna transmission/reception system, such as a CoMP, in which a UE may receive a CSI-RS of a cell other than a serving cell, the UE may perform blanking for leaving data blank without transmitting the data or muting for transmitting data with zero power with respect to REs through which CSI-RSs are transmitted by a cell group other than a cell group, to which the UE and the serving cell belong, among a total of 3 cell groups.

Figure 17:
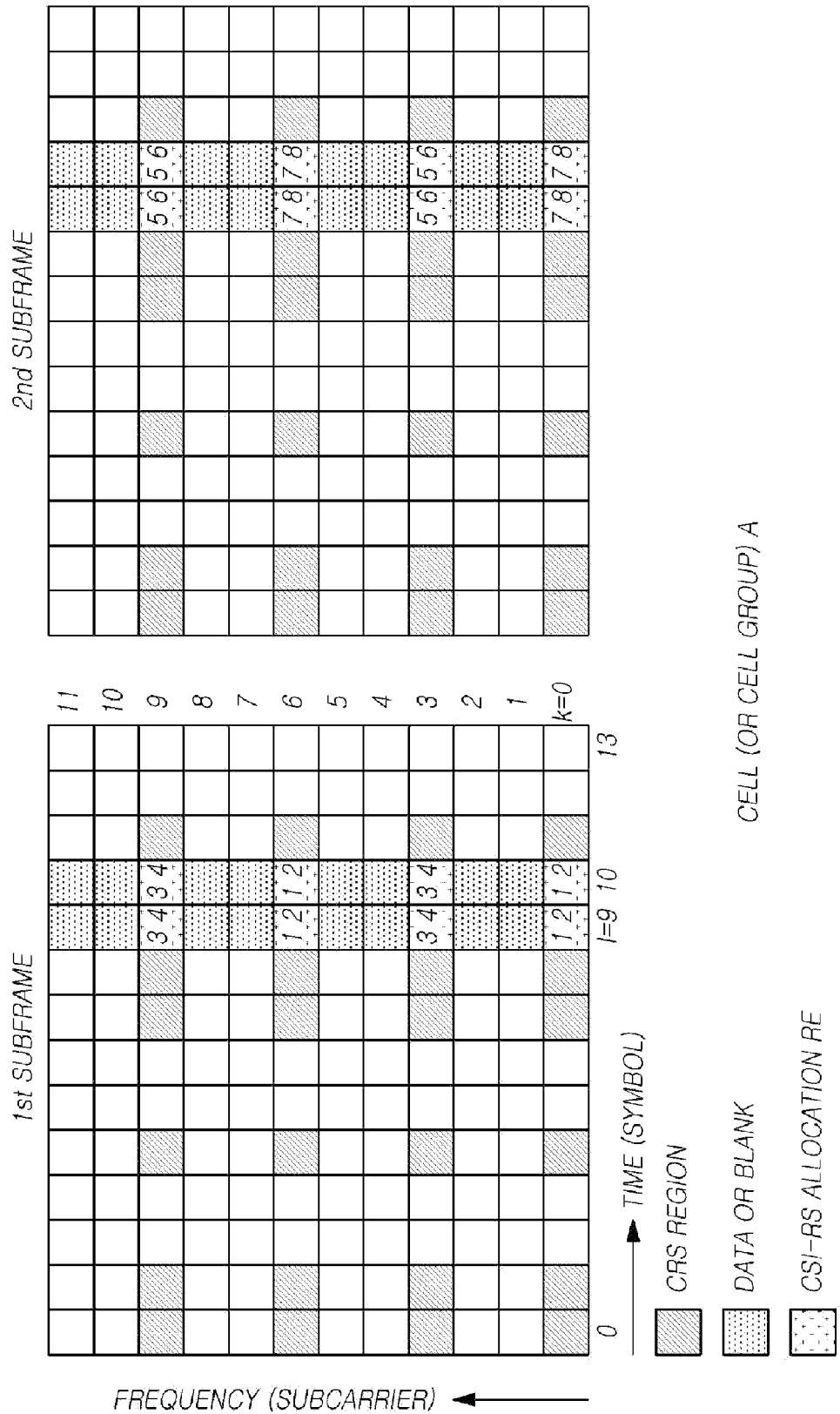
FIG. 17 is an illustrative view showing a scheme for allocating CSI-RSs according to an exemplary embodiment of the present invention.

FIG. 17 is an illustrative view showing a scheme for CSI-RS allocation in (FDM+CDM) according to an exemplary embodiment.

When a CSI-RS for each of a maximum of 8 antenna ports is allocated to a time-frequency domain in an exemplary embodiment of FIG. 17, a CSI-RS for each of the 2 antenna ports is allocated to 2 REs or subcarriers within a first symbol (or symbol axis) in a first subframe or Resource Block (RB). Then, each of the CSI-RSs according to the 2 antenna ports, which have been allocated to the first symbol (or symbol axis), is equally allocated to 2 REs within a second symbol (or symbol axis) in the same subframe. Consequently, a total of the 8 CSI-RS allocation REs are arranged in the first subframe or RB. Further, CSI-RSs according to 2 antenna ports among the remaining 6 antenna ports excluding the previously-allocated 2 antenna ports, are distinguished from the CSI-RSs according to the previously-allocated 2 antenna ports by the OCC in the first subframe or RB. Then, each of the distinguished CSI-RSs according to the 2 antenna ports can be duplicately allocated to 4 CSI-RS allocation REs of the 8 CSI-RS allocation REs in the first subframe or RB. A CSI-RS for each of the remaining 4 antenna ports, which are not allocated to the first subframe, can be allocated to a second subframe in the allocation scheme applied to the first subframe.

Namely, a CSI-RS for each of the 2 antenna ports is allocated to 2 REs of the 4 REs corresponding to 4 subcarriers among 12 subcarriers along the frequency axis within the first symbol in a single RB. At this time, a distance between the CSI-RSs allocated according to the 2 antenna ports may be as long as 3 subcarriers. In the same scheme as described above, a CSI-RS for each of the 2 equal antenna ports is allocated to one of the 2 REs within the second symbol (or symbol axis) in the same RB. In this case, a CSI-RS for each of a total of the 2 antenna ports is allocated to the 2 symbols in a single subframe. CSI-RSs according to the 2 antenna ports excluding the previously-allocated 2 antenna ports are distinguished from the CSI-RSs according to the previously-allocated 2 antenna ports by different codes, such as the OCC, which have orthogonality, in the same subframe. For example, the CSI-RS antenna ports 1 and 2 are mapped to the same RE in the same subframe, and the same RE, which is allocated the CSI-RSs according to the CSI-RS antenna ports 1 and 2, is transmitted. If the CSI-RSs according to the CSI-RS antenna ports 1 and 2 are allocated to the same RE, they are distinguished by the OCC. The scheme as described above is similarly applied to the antenna ports 3 and 4. Also, a CSI-RS for each of the remaining 4 antenna ports (e.g., the CSI-RS antenna ports 5, 6, 7 and 8) is allocated to 2 symbols in another subframe in the scheme as described above. Therefore, the CSI-RSs are allocated to the 2 subframes among a total of 10 subframes.

Referring to FIG. 17, the above allocation scheme will be described in detail as follows. CSI-RSs according to the antenna ports 1 and 2 distinguished by the OCC are duplicately allocated to 2 REs located at (l, k)=(9 and 10, 0) in the first subframe. CSI-RSs according to the antenna ports 3 and 4 distinguished by the OCC are duplicately allocated to 2 REs located at (l, k)=(9 and 10, 3) which is as distant as 3 REs from the location (9 and 10, 0) in the direction of the frequency axis. CSI-RSs according to the antenna ports 1 and 2 distinguished by the OCC are duplicately allocated to 2 REs located at (l, k)=(9 and 10, 6) which is as distant as 3 REs from the location (9 and 10, 3) in the direction of the frequency axis.

Consequently, a total of 4 REs are allocated CSI-RSs for each of 2 antenna port sets, each of which includes 2 antenna ports among the antenna ports 1 to 4, in the first subframe. Therefore, the above allocation scheme satisfies the requirements of CSI-RS allocation overhead such that a CSI-RS for each antenna port may be allocated to 2 REs in a radio frame.

Further, a CSI-RS for each of the remaining 4 antenna ports 5 to 8 may be allocated to another second subframe in the allocation scheme applied to the first subframe.

At this time, there may be changes in numbers of antenna ports of which CSI-RSs are duplicately allocated to the same RE (i.e., grouping of antenna port sets), the order of antenna port numbers in the direction of the frequency axis, etc. In this regard, aspects of the present invention are not limited to the example of FIG. 17.

The CSI-RS mapping or allocation scheme according to aspects of the present invention as described above can be defined by equation (4) below. However, equation (4) expresses a representative example for purposes of understanding of this embodiment, and may be differently expressed while maintaining the basic scheme as described above.

CSI-RS antenna ports=1, 3, 5, 7: OCC [+1, +1]
CSI-RS antenna ports=2, 4, 6, 8: OCC [+1, −1]
Subframe A: transmission through CSI-RS antenna ports=1, 2, 3, 4
Subframe B: transmission through CSI-RS antenna ports=5, 6, 7, 8

$$k = 6 \cdot m + (v + v_{shift}) \bmod 12 \quad (4)$$
$$l = 9, 10$$
$$m = 0, 1, 2, \ldots, 2 \cdot N_{RB}^{DL} - 1$$
$$v = \begin{cases} 0 & \text{if } CSI\text{-}RS \text{ antenna ports} = 1, 2, 7, 8 \\ 3 & \text{if } CSI\text{-}RS \text{ antenna ports} = 3, 4, 5, 6 \end{cases}$$
$$v_{shift} = N_{ID}^{cell} \bmod 6$$

Herein, k represents a subcarrier number of an RE allocated a CSI-RS. l of an RE allocated a CSI-RS represents symbol (or symbol axis) numbers 0 to 13.

Also, equation (4) defines l of an RE allocated a CSI-RS to have 9 or 10 as a symbol (or symbol axis) number. However, aspects of the present invention are not limited thereto. Two optional symbols (or symbol axes), which are adjacent or not adjacent, may be used among a total of 14 symbols or symbol axes if a normal CP is used, and if an extended CP is used, the number of symbols or symbol axes may be 12 or 6.

Further, as described above, there may be changes in numbers of antenna ports of which CSI-RSs are duplicately allocated to the same RE, the order of antenna port numbers in the direction of the frequency axis, etc. Aspects of the present invention are not limited to the example of FIG. 17. Namely, in FIG. 17 and equation (4), the antenna ports, which are allocated to the CSI-RS allocation REs in the first subframe, are indicated by (1, 2), (3, 4), (1, 2) and (3, 4) in the order of lower subcarriers. However, aspects of the present invention are not limited thereto. Also, in FIGS. 13 to 15, the antenna ports 1 to 4 are allocated to the first subframe, and the antenna ports 5 to 8 are allocated to the second subframe. However, aspects of the present invention are not limited thereto.

Here, the Orthogonal Cover Code (OCC) may be an optional code system, such as the 2-digit Walsh code system, in which codes have mutual orthogonality. Namely, in FIG. 17, a CSI-RS of an antenna port forward indicated within each RE, for example, is distinguished by an OCC 1, such as [1, 1], and a CSI-RS of an antenna port backward indicated within each RE, for example, is distinguished by an OCC 2, such as [1, −1], which is orthogonal to the OCC 1.

As illustrated in FIG. 17, the 2 antenna ports duplicately allocated to 4 REs may be neighboring antenna ports. Namely, in FIG. 17, the 2 antenna ports, which are duplicately allocated to (l, k)=(9 and 10, 0), neighboring antenna ports 1 and 2.

The first and second subframes may be optional in determining the locations thereof but may have an appropriate distance therebetween in a single radio frame. For example, if numbers of subframes included in the radio frame are defined to be 0 to 9 and the first subframe is located at the subframe number 1, the second subframe is arranged at the subframe number 6 among the subframe numbers. However, aspects of the present invention are not limited thereto, and the first and second subframes may be adjacent or arranged differently.

Namely, CSI-RSs are allocated to 2 subframes among a total of 10 subframes in consideration of CSI-RS allocation overhead. The 2 subframes may be continuous or may have a specific period. Namely, the 2 subframes having similar configurations are transmitted in the scheme of FIG. 17. Therefore, the 2 subframes may be transmitted at intervals of 5 ms, which is obtained by dividing a total of 10 ms by 2.

A scheme for alternate CSI-RS allocation between cells (or cell groups) can also be adopted in an exemplary embodiment of FIG. 17 similar to as illustrated in FIGS. 10 to 12.

Namely, according to equation (4), a scheme for CSI-RS allocation for each antenna port may be similar to as illustrated in FIG. 17, and a CSI-RS for each antenna port is allocated in such a scheme as to have offsets or frequency shifts according to cells (or cell groups), even though the scheme is not shown in FIG. 17.

In other words, if at least one resource block is included, each antenna port allocates a CSI-RS to each $6^{th}$ subcarrier and transmits each $6^{th}$ subcarrier allocated the CSI-RS in view of the entire frequency axis. Referring to FIG. 17, the CSI-RS antenna port 1, for example, is mapped to each $(k=6 \cdot m)^{th}$ ($m=0, 1, 2, \ldots, 2 \cdot N_{RB}^{DL}-1$) subcarrier within the $10^{th}$ and $11^{th}$ symbols (having symbol numbers l=9 and 10) in a particular subframe. Herein, a total 6 of 0 to 5 offsets or frequency shifts according to cell groups may be expressed by $k=6 \cdot m+v_{shift}$ ($m=0, 1, 2, \ldots, 2 \cdot N_{RB}^{DL}-1$). At this time, there are different values of $v_{shift}$ according to the cells. For example, $v_{shift}$ may be expressed by $v_{shift}=N_{ID}^{cell} \bmod 6$ according to Physical Cell Identities (PCIs), which are cell IDs.

If the 6 offsets or frequency shifts are also applied to each of other antenna ports according to PCIs in the above scheme, a distance between CSI-RSs allocated for each of antenna ports may be as long as 3 subcarriers. Therefore a total of 3 cell groups (a cell group A: $N_{ID}^{cell} \bmod 3=0$, a cell group B: $N_{ID}^{cell} \bmod 3=1$, and a cell group C: $N_{ID}^{cell} \bmod 3=2$) have perfectly-distinguished CSI-RS allocation patterns with respect to time-frequency resources, respectively.

Namely, if the antenna port set (1, 2) is taken as an example, the CSI-RS allocation patterns signify a scheme in which the antenna port set (1, 2) is allocated to (l, k)=(9 and 10, 0 and 6) (shown on the left in FIG. 17 and $N_{ID}^{cell} \bmod 3=0$) in the first subframe in the cell group A, but the antenna port set (1, 2) is allocated to (l, k)=(9 and 10, 1 and 7) $N_{ID}^{cell} \bmod 3=1$) in the first subframe in the cell group B (not shown), and is allocated to (l, k)=(9 and 10, 2 and 8) ($N_{ID}^{cell} \bmod 3=2$) in the first subframe in the cell group C (not shown).

Also, the locations of the first and second subframes may be differently arranged for each cell group.

In other words, in the embodiment as described above, offsets or frequency shifts according to cell groups may be applied to a location of CSI-RS allocation in the direction of the frequency axis for each antenna port in a single subframe, and thereby CSI-RS allocation patterns may be differently defined among neighboring cells. However, further, subframes allocated CSI-RSs may be made different for each neighboring cell.

For example, if the 2$^{nd}$ and 7$^{th}$ subframes, which have been allocated CSI-RSs, among 10 subframes have been transmitted by a particular cell group, the 3$^{rd}$ and 8$^{th}$ subframes are transmitted by another cell group. By making the relative locations of the first and second subframes different for each cell group in this manner, interference between neighboring cells may be further reduced. However, aspects of the present invention are not limited thereto.

Also, a communication system, such as a CoMP, enables blanking or muting to be performed in an exemplary embodiment of FIG. 17, similar to described with respect to FIGS. 10 to 12.

In order to avoid overlapping of description, a brief description will be made as follows. In a cooperative multi-antenna transmission/reception system, such as a CoMP, in which a UE may receive a CSI-RS of a cell other than a serving cell, the UE may perform blanking for leaving data blank without transmitting the data or muting for transmitting data with zero power with respect to REs through which CSI-RSs are transmitted by a cell group other than a cell group, to which the UE and the serving cell belong, among a total of 3 cell groups.

Figure 18:
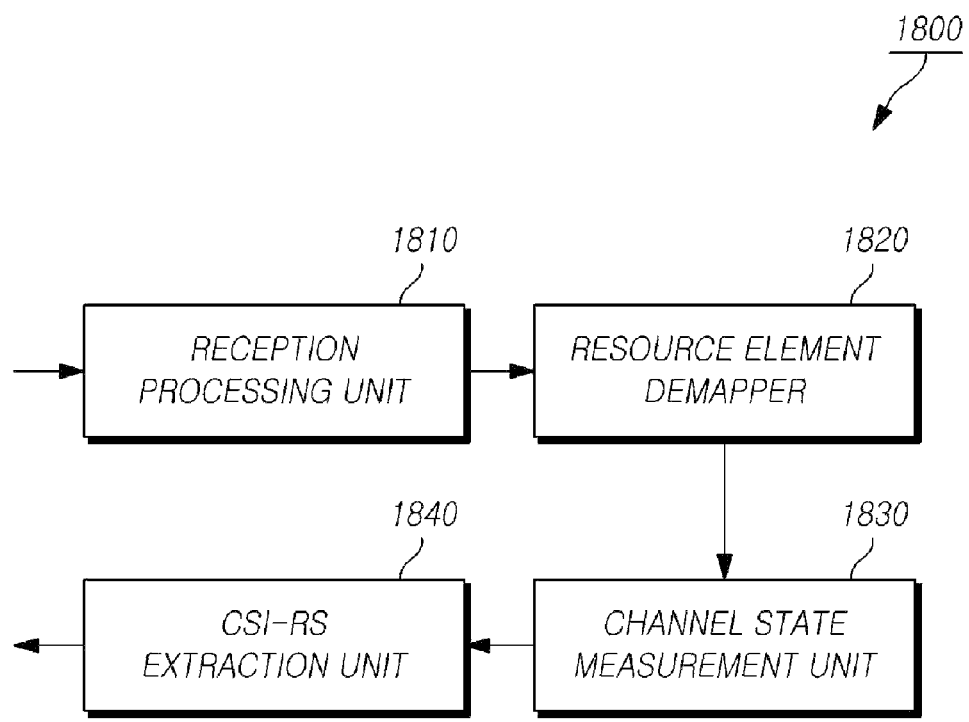
FIG. 18 is a block diagram illustrating the configuration of a receiver to receive a CSI-RS according to an exemplary embodiment of the present invention.

FIG. 18 is a block diagram illustrating the configuration of a receiver to receive a CSI-RS transmitted by a scheme for CSI-RS allocation and transmission according an exemplary embodiment. Referring to FIG. 18, in a wireless communication system, a reception apparatus 1800 of a UE includes a reception processing unit 1810, a resource element demapper 1820, a CSI-RS extraction unit 1840, and a channel state measurement unit 1830, and may further include a decoding unit (not shown), a control unit, etc. (not shown). In this case, the reception apparatus 1800 may be the UE 10 as illustrated in FIG. 1.

The reception processing unit 1810 receives a signal through each antenna port of the reception apparatus 1800. The resource element demapper 1820 demaps information allocated to each Resource Element (RE) from the received signal. The demapped information may include control information, and CSI-RSs and reference signals of various kinds according to multi-antenna ports other than data information.

The CSI-RS extraction unit 1840 may be included in the resource element demapper 1820 or may operate in connection with the resource element demapper 1820. When demapping information allocated to each RE, the resource element demapper 1820 demaps and extracts information related to the CSI-RSs. The CSI-RS extraction unit 1840 extracts CSI-RS information for each antenna port in reverse order of the scheme for the CSI-RS allocation in one of the schemes as shown in FIGS. 8 to 17. The channel state measurement unit 1830 measures, based on the extracted CSI-RS information, how the CSI-RS information is changed while the extracted CSI-RS information goes through a channel, and obtains Channel Spatial Information (CSI) corresponding to channel state information for each antenna port in a multi-antenna system including multiple antennas.

In other words, the CSI-RS extraction unit further includes that; the CSI-RS extraction unit extracts that, for the maximum N antenna ports (N being an integer larger than or equal to 1) for transmission of the CSI-RS, the CSI-RS sequence is mapped to REs corresponding to one sub-carrier at every 12 sub-carriers for each antenna port with respect to two Orthogonal Frequency Division Multiplexing (OFDM) symbols within a sub-frame by which the CSI-RS is transmitted, for ⌈N/2⌉ antenna port sets, each of which includes either both an M$^{th}$ (M≤N, and M being an odd number) antenna port and an (M+1)$^{th}$ antenna port or only the M$^{th}$ antenna port if the (M+1)$^{th}$ antenna port does not exist and is used as an antenna port set for transmission of the CSI-RS, a CSI-RS of antenna ports within each of the antenna port sets is allocated to REs having the same time-frequency resource and are discriminated from each other by orthogonal codes, and the CSI-RS allocated for two adjacent antenna port sets within a resource block are spaced apart from each other with an interval of 3 REs in the frequency axis.

The reception apparatus 1800 makes a pair with or connects to the wireless communication system or the transmission apparatus 800 as described above with reference to FIG. 8, and receives a signal transmitted by the transmission apparatus 800. Therefore, the reception apparatus 1800 includes elements for signal processing in the reverse process of signal processing of the transmission apparatus 800. Therefore, the reception apparatus 1800 may include elements for signal processing in the reverse process of signal processing of the transmission apparatus 800.

Figure 19:
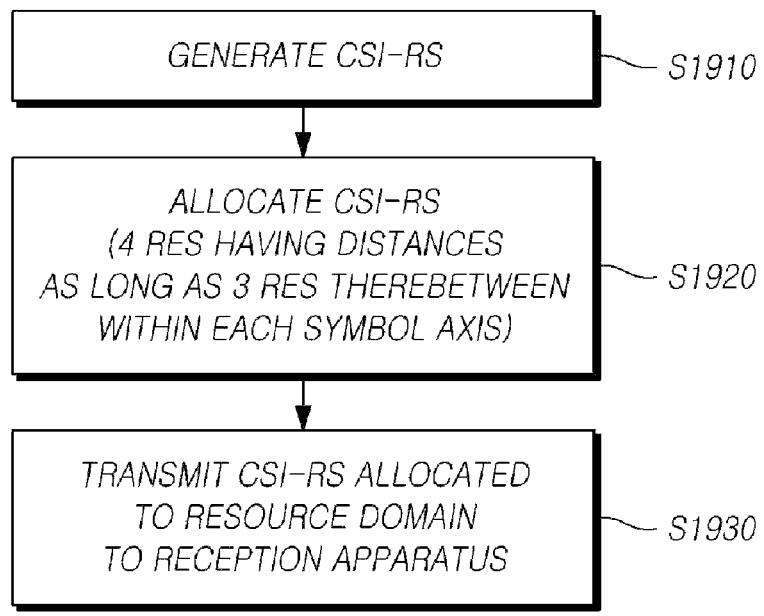
FIG. 19 is a flowchart illustrating a method of CSI-RS transmission according to an exemplary embodiment of the present invention.

FIG. 19 is a flowchart showing the flow of a CSI-RS transmission method according to an exemplary embodiment. A CSI-RS transmission method according to aspects of the present invention includes generating a CSI-RS or sequence for each antenna port in operation S1910, allocating a CSI-RS for each antenna port to 4 REs or subcarrier on a basis of a single symbol (or symbol axis) in a single subframe, and allocating the CSI-RS for each antenna port in such a manner that a distance between neighboring CSI-RS allocation REs or subcarriers may be as long as 3 REs or subcarriers in operation S1920, and transmitting CSI-RSs, which have been allocated to a time-frequency resource domain, to the reception apparatus in operation S1930.

In operation S1920, a CSI-RS for a particular antenna port can be allocated in such a manner as to have frequency shifts in the direction of the frequency axis according to cells (or cell groups). Further, in operation S1920, the CSI-RSs are allocated to 2 symbols (or symbol axes) in a single subframe or RB. At this time, a CSI-RS for each of a total of 8 antenna ports is individually allocated to a single RE in a first subframe or RB. CSI-RSs according to antenna ports excluding the previously-allocated antenna ports are distinguished from CSI-RSs according to the previously-allocated antenna ports by using the Orthogonal Cover Code (OCC), and each of the distinguished CSI-RSs according to the antenna ports is duplicately allocated to 2 REs in a first subframe or RB. The scheme as described above, which has been applied to the first subframe or RB, can be similarly applied to another or second subframe or RB to which a CSI-RS for each of a total of the 8 antenna ports to be allocated.

Also, in operation S1920, the CSI-RSs are allocated to 2 symbols (or symbol axes) in a single subframe or RB. At this time, a CSI-RS for each of a total of 4 antenna ports is individually allocated to 2 REs in a first subframe or RB. CSI-RSs according to antenna ports excluding the previously-allocated antenna ports are distinguished from CSI-RSs according to the previously-allocated antenna ports by using the Orthogonal Cover Code (OCC), and each of the distinguished CSI-RSs according to the antenna ports is duplicately allocated to 4 REs in a first subframe or RB. The scheme as described above, which has been applied to the first subframe or RB, is similarly applied to another or second subframe or RB to which a CSI-RS for each of the remaining 4 antenna ports excluding the 4 antenna ports allocated to the first subframe or RB is to be allocated.

A CSI-RS allocation method and a CSI-RS transmission method according to exemplary embodiments other than the exemplary embodiments as described above may use one of or all of the schemes as shown in FIGS. 8 to 17. In order to avoid overlapping of description, a detailed description will be omitted.

According to aspects of the present invention, CSI-RSs are allocated to a time-frequency domain in such a manner as to have perfect orthogonality (in a CoMP) or quasi-orthogonality (in a non-CoMP) according to cells (or cell groups) in the range of following CSI-RS transmission overhead. As a result, performance degradation caused by interference between neighboring cells can be reduced.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for receiving a Channel State Information-Reference Signal (CSI-RS), the method comprising:
    receiving a signal comprising CSI-RSs for antenna ports in a first antenna port set, the first antenna port set comprising a first antenna port and a second antenna port, and the CSI-RSs for the antenna ports in the first antenna port set being allocated to 2 consecutive Resource Elements (REs);
    extracting the CSI-RSs for the antenna ports in the first antenna port set from the received signal; and
    acquiring channel state information of the first antenna port and channel state information of the second antenna port based on the extracted CSI-RSs,
    wherein the CSI-RSs for the antenna ports in the first antenna port set are allocated to the 2 consecutive REs in a time-frequency resource area, the time-frequency resource area being defined by one sub-frame and 12 sub-carriers, and the 2 consecutive REs corresponding to 1 sub-carrier in a frequency axis and two symbols in a time axis, and
    wherein the CSI-RS for the first antenna port in the first antenna port set and the CSI-RS for the second antenna port in the first antenna port set are discriminated from each other by orthogonal codes.

2. The method of claim 1, further comprising:
    extracting, from the received signal, CSI-RSs for antenna ports in a second antenna port set different from the first antenna port set,
    wherein each antenna port set includes two antenna ports, and the CSI-RSs for the antenna ports in the second antenna port set are allocated to a different 2 consecutive REs in the time-frequency resource area, and
    wherein the 2 consecutive REs in which the CSI-RSs for the antenna ports in the first antenna port set are allocated and the 2 consecutive REs in which the CSI-RSs for the antenna ports in the second antenna port set are allocated are spaced apart from each other along the frequency axis.

3. The method of claim 1, wherein the first antenna port and the second antenna port in the first antenna port set have consecutive antenna port numbers.

4. The method of claim 1, wherein, if 4 antenna port sets including the first antenna port set are determined for transmitting CSI-RSs, CSI-RSs for antenna ports in the 4 antenna port sets are allocated to 8 REs, the 8 REs corresponding to 4 evenly-spaced sub-carriers in a frequency axis and two symbols in a time axis, and
    wherein CSI-RSs for antenna ports in each antenna port set are allocated to 2 consecutive REs corresponding to one of the 4 evenly-spaced sub-carriers and the two symbols.

5. The method of claim 4, wherein the 4 antenna port sets are determined such that the first antenna port set has antenna port numbers M and M+1, a second antenna port set has antenna port numbers M+2 and M+3, a third antenna port set has antenna port numbers M+4 and M+5, and a fourth antenna port set has antenna port numbers M+6 and M+7, where M is an integer.

6. A method for transmitting a Channel State Information-Reference Signal (CSI-RS), the method comprising:
    generating CSI-RSs for antenna ports in a first antenna port set, the first antenna port set comprising a first antenna port and a second antenna port;
    allocating the CSI-RSs for the antenna ports in the first antenna port set to 2 consecutive Resource Elements (REs) in a time-frequency resource area, the time-frequency resource area being defined by one sub-frame and 12 sub-carriers, and the 2 consecutive REs corresponding to 1 sub-carrier in a frequency axis and two symbols in a time axis; and
    transmitting the allocated CSI-RSs to a User Equipment,
    wherein the CSI-RS for the first antenna port in the first antenna port set and the CSI-RS for the second antenna port in the first antenna port set are discriminated from each other by orthogonal codes.

7. The method of claim 6, further comprising:
    allocating CSI-RSs for antenna ports in a second antenna port set different from the first antenna port set,
    wherein each antenna port set includes two antenna ports, and the CSI-RSs for the antenna ports in the second antenna port set are allocated to a different 2 consecutive REs in the time-frequency resource area, and
    wherein the 2 consecutive REs in which the CSI-RSs for the antenna ports in the first antenna port set are allocated and the 2 consecutive REs in which the CSI-RSs for the antenna ports in the second antenna port set are allocated are spaced apart from each other along the frequency axis.

8. The method of claim 6, wherein the first antenna port and the second antenna port in the first antenna port set have consecutive antenna port numbers.

9. The method of claim 6, wherein, if 4 antenna port sets including the first antenna port set are determined for transmitting CSI-RSs, CSI-RSs for antenna ports in the 4 antenna port sets are allocated to 8 REs, the 8 REs corresponding to 4 evenly-spaced sub-carriers in a frequency axis and two symbols in a time axis, and
    wherein CSI-RSs for antenna ports in each antenna port set are allocated to 2 consecutive REs corresponding to one of the 4 evenly-spaced sub-carriers and the two symbols.

10. The method of claim 9, wherein the 4 antenna port sets are determined such that the first antenna port set has antenna port numbers M and M+1, a second antenna port set has antenna port numbers M+2 and M+3, a third antenna port set has antenna port numbers M+4 and M+5, and a fourth antenna port set has antenna port numbers M+6 and M+7, where M is an integer.

11. A User Equipment (UE) to receive a Channel State Information-Reference Signal (CSI-RS), the UE comprising:
    a receiver to receive a signal comprising CSI-RSs for antenna ports in a first antenna port set, the first antenna port set comprising a first antenna port and a second antenna port, and the CSI-RSs for the antenna ports in the first antenna port set being allocated to 2 consecutive Resource Elements (REs);

a processor to extract the CSI-RSs for the antenna ports in the first antenna port set from the received signal, and to acquire channel state information of the first antenna port and channel state information of the second antenna port based on the extracted CSI-RSs, wherein the CSI-RSs for the antenna ports in the first antenna port set are allocated to the 2 consecutive REs in a time-frequency resource area, the time-frequency resource area being defined by one sub-frame and 12 sub-carriers, and the 2 consecutive REs corresponding to 1 sub-carrier in a frequency axis and two symbols in a time axis, and wherein the CSI-RS for the first antenna port in the first antenna port set and the CSI-RS for the second antenna port in the first antenna port set are discriminated from each other by orthogonal codes.

12. The UE of claim 11, wherein the processor further extracts, from the received signal, CSI-RSs for antenna ports in a second antenna port set different from the first antenna port set, wherein each antenna port set includes two antenna ports, and the CSI-RSs for the antenna ports in the second antenna port set are allocated to a different 2 consecutive REs in the time-frequency resource area, and wherein the 2 consecutive REs in which the CSI-RSs for the antenna ports in the first antenna port set are allocated and the 2 consecutive REs in which the CSI-RSs for the antenna ports in the second antenna port set are allocated are spaced apart from each other along the frequency axis.

13. The UE of claim 11, wherein the first antenna port and the second antenna port in the first antenna port set have consecutive antenna port numbers.

14. The UE of claim 11, wherein, if 4 antenna port sets including the first antenna port set are determined for transmitting CSI-RSs, CSI-RSs for antenna ports in the 4 antenna port sets are allocated to 8 REs, the 8 REs corresponding to 4 evenly-spaced sub-carriers in a frequency axis and two symbols in a time axis, and wherein CSI-RSs for antenna ports in each antenna port set are allocated to 2 consecutive REs corresponding to one of the 4 evenly-spaced sub-carriers and the two symbols.

15. The UE of claim 14, wherein the 4 antenna port sets are determined such that the first antenna port set has antenna port numbers M and M+1, a second antenna port set has antenna port numbers M+2 and M+3, a third antenna port set has antenna port numbers M+4 and M+5, and a fourth antenna port set has antenna port numbers M+6 and M+7, where M is an integer.

16. An evolved node B (eNodeB) to transmit a Channel State Information-Reference Signal (CSI-RS), the eNodeB comprising:

a processor to generate CSI-RSs for antenna ports in a first antenna port set, the first antenna port set comprising a first antenna port and a second antenna port, and to allocate the CSI-RSs for the antenna ports in the first antenna port set to 2 consecutive Resource Elements (REs) in a time-frequency resource area, the time-frequency resource area being defined by one sub-frame and 12 sub-carriers, and the 2 consecutive REs corresponding to 1 sub-carrier in a frequency axis and two symbols in a time axis; and a transmitter to transmit the allocated CSI-RSs to a User Equipment, wherein the CSI-RS for the first antenna port in the first antenna port set and the CSI-RS for the second antenna port in the first antenna port set are discriminated from each other by orthogonal codes.

17. The eNodeB of claim 16, wherein the processor further allocates CSI-RSs for antenna ports in a second antenna port set different from the first antenna port set, wherein each antenna port set includes two antenna ports, and the CSI-RSs for the antenna ports in the second antenna port set are allocated to a different 2 consecutive REs in the time-frequency resource area, and wherein the 2 consecutive REs in which the CSI-RSs for the antenna ports in the first antenna port set are allocated and the 2 consecutive REs in which the CSI-RSs for the antenna ports in the second antenna port set are allocated are spaced apart from each other along the frequency axis.

18. The eNodeB of claim 16, wherein the first antenna port and the second antenna port in the first antenna port set have consecutive antenna port numbers.

19. The eNodeB of claim 16, wherein, if 4 antenna port sets including the first antenna port set are determined for transmitting CSI-RSs, CSI-RSs for antenna ports in the 4 antenna port sets are allocated to 8 REs, the 8 REs corresponding to 4 evenly-spaced sub-carriers in a frequency axis and two symbols in a time axis, and wherein CSI-RSs for antenna ports in each antenna port set are allocated to 2 consecutive REs corresponding to one of the 4 evenly-spaced sub-carriers and the two symbols.

20. The eNodeB of claim 19, wherein the 4 antenna port sets are determined such that the first antenna port set has antenna port numbers M and M+1, a second antenna port set has antenna port numbers M+2 and M+3, a third antenna port set has antenna port numbers M+4 and M+5, and a fourth antenna port set has antenna port numbers M+6 and M+7, where M is an integer.

* * * * *